United States Patent
Ivey et al.

(10) Patent No.: US 11,720,416 B2
(45) Date of Patent: Aug. 8, 2023

(54) ADAPTIVE SYNCHRONIZATION FOR REDO WRITING TO PERSISTENT MEMORY STORAGE

(71) Applicant: Oracle International Corporation, Redwood Shores, CA (US)

(72) Inventors: Graham Ivey, Hook (GB); Yunrui Li, Los Altos, CA (US)

(73) Assignee: Oracle International Corporation, Redwood Shores (CA)

( * ) Notice: Subject to any disclaimer, the term of this patent is extended or adjusted under 35 U.S.C. 154(b) by 533 days.

(21) Appl. No.: 16/570,895

(22) Filed: Sep. 13, 2019

(65) Prior Publication Data

US 2021/0081242 A1    Mar. 18, 2021

(51) Int. Cl.
*G06F 9/52* (2006.01)
*G06F 9/48* (2006.01)
(Continued)

(52) U.S. Cl.
CPC ............ *G06F 9/522* (2013.01); *G06F 9/4418* (2013.01); *G06F 9/46* (2013.01); *G06F 9/465* (2013.01);
(Continued)

(58) Field of Classification Search
CPC . G06F 9/46; G06F 9/465; G06F 9/466; G06F 9/467; G06F 9/48; G06F 9/4806; G06F 9/4812; G06F 9/4843; G06F 9/485; G06F 9/4887; G06F 9/50; G06F 9/52; G06F 9/522; G06F 9/524; G06F 9/526; G06F 9/544; G06F 16/252; G06F 9/4418
See application file for complete search history.

(56) References Cited

U.S. PATENT DOCUMENTS 5,566,351 A    10/1996    Crittenden et al.
6,848,005 B1    1/2005    Plevyak et al.
(Continued)

OTHER PUBLICATIONS

Li et al, "The thrifty barrier: energy-aware synchronization in shared-memory multiprocessors," 10th International Symposium on High Performance Computer Architecture (HPCA'04), 2004, pp. 14-23, doi: 10.1109/HPCA.2004.10018 (Year: 2004).*
(Continued)

*Primary Examiner* — Charles M Swift
(74) *Attorney, Agent, or Firm* — Vista IP Law Group, LLP

(57) ABSTRACT

A computer's processes and/or threads generate and store in memory, data to reimplement or reverse a transaction on a database, so that the database can be recovered. This data is written to persistent memory storage ("persisted") by another process, for which the processes and/or threads may wait. This wait includes at least a sleep phase, and additionally a spin phase which is entered if after awakening from sleep and checking ("on-awakening" check), the data to be persisted is found to not have been persisted. To sleep in the sleep phase, each process/thread specifies a sleep duration determined based at least partially on previous results of on-awakening checks. The previous results in which to-be-persisted data was found to be not persisted are indications the sleeps were insufficient, and these indications are counted and used to determine the sleep duration. Repeated determination of sleep duration makes the sleep phase adaptive.

20 Claims, 7 Drawing Sheets

(51) Int. Cl.
*G06F 9/46* (2006.01)
*G06F 9/50* (2006.01)
*G06F 16/25* (2019.01)
*G06F 9/54* (2006.01)
*G06F 9/4401* (2018.01)

(52) U.S. Cl.
CPC .............. *G06F 9/466* (2013.01); *G06F 9/467* (2013.01); *G06F 9/48* (2013.01); *G06F 9/485* (2013.01); *G06F 9/4806* (2013.01); *G06F 9/4812* (2013.01); *G06F 9/4843* (2013.01); *G06F 9/4887* (2013.01); *G06F 9/50* (2013.01); *G06F 9/52* (2013.01); *G06F 9/524* (2013.01); *G06F 9/526* (2013.01); *G06F 9/544* (2013.01); *G06F 16/252* (2019.01)

(56) References Cited

U.S. PATENT DOCUMENTS

| | | | |
|---|---|---|---|
| 8,392,923 | B2 | 3/2013 | Walters |
| 9,418,129 | B2 | 8/2016 | Cao Minh et al. |
| 2010/0332770 | A1* | 12/2010 | Dice .................. G06F 9/526 711/E12.066 |
| 2012/0144376 | A1* | 6/2012 | Van Eijndhoven ..... G06F 8/456 717/146 |
| 2012/0323849 | A1* | 12/2012 | Garin, Jr. ................ G06F 16/27 707/617 |
| 2013/0244686 | A1 | 9/2013 | Saha et al. |
| 2014/0258223 | A1* | 9/2014 | Cao Minh ............... G06F 16/27 707/610 |
| 2017/0177698 | A1* | 6/2017 | Lee ..................... G06F 16/2315 |
| 2017/0199681 | A1 | 7/2017 | Jain |
| 2019/0102216 | A1 | 4/2019 | Mathur et al. |

OTHER PUBLICATIONS

Jung et al, "Scalable Database Logging for Multicores", Proceedings of the VLDB Endowment, vol. 11, No. 2, 2017, pp. 135-148 (Year: 2017).*

Unknown, Sleep (system call), Wikipedia, believed to be published prior to Feb. 10, 2017, downloaded from https://en.wikipedia.org/w/index.php?title=Sleep_(system_call).

Corbet, Jonathan et al., "Blocking I/O", Linux Device Drivers, Chapter 6, Section 2, believed to be published Feb. 2005, pp. 14.

"3D XPoint", Wikipedia, Retrieved from https://en.wikipedia.org/wiki/3D_XPoint, Apr. 17, 2019, 6 pages.

"Managing the Redo Log", Chapter 11, Oracle Database Database Administrator's Guide, 18c, by Rajesh Bhatiya, Randy Urbano, Mar. 2019, 25 pages.

"Intel Launches Optane DIMMs Up To 512GB: Apache Pass Is Here!" by Ian Cutress & Billy Tallis, Retrieved from https://www.anandtech.com/show/12828/intel-launches-optane-dimms-up-to-512gb-apachepass-is-here, May 30, 2018, 3 pages.

"Redo log", Wikipedia, Retrieved from https://en.wikipedia.org/wiki/Redo_log, Aug. 13, 2017, 4 pages.

* cited by examiner

ADAPTIVE SYNCHRONIZATION FOR REDO WRITING TO PERSISTENT MEMORY STORAGE

BACKGROUND

In some computers, sets of software instructions that can be executed at least partially independent of one another are scheduled by an operating system to use a processor in a time-shared manner. Specifically, a particular sequence of execution (which may be a thread of a process, or a process that has no threads) of a series of instructions (also called "computer program"), receives control of a processor for a period of time allocated thereto ("time slice"). When the time slice ends, the processor is allocated by a scheduler in the operating system to another sequence of execution, which may be (1) another thread of the same process or (2) another thread of another process, or (3) another process, and which is selected from a queue ("runnable queue") of sequences of execution, which are currently awaiting execution, thereby to implement time sharing of the processor.

Any process or thread that is currently being executed by a processor ("running process" or "running thread") may relinquish control of the processor during its time slice, by making a sleep( ) system call to the operating system. A running process (or running thread) which goes to sleep via the sleep( ) system call, is thereafter awakened by the scheduler, after passage of an amount of time specified in an argument of the sleep( ) system call. Specifically, when the specified amount of time passes, the scheduler adds into the runnable queue, as a newly runnable process (or thread), a sleeping process (or thread) that is currently in a "not-runnable" queue, into which it was placed for the specified amount of time. This newly runnable process (or thread) receives control of a processor whenever its turn arrives (based on its position in the runnable queue). Due to delays inherent in context switching, there is no guarantee that this newly runnable process (or thread) will receive control of a processor immediately after the specified amount of time.

Some methods by which a process or thread may wait for completion of an I/O command, are described in US Patent Publication 20190102216, entitled "Automatically Limiting Repeated Checking On Completion Of A Command Without Relinquishing A Processor" by Bhaskar Mathur et al., which is incorporated by reference herein in its entirety, as background.

Processes and/or threads of the type described above can be executed in a computer that implements a database management system through which a database is queried using statements, e.g. expressed in a structured query language (SQL). In some database management systems, in order to be able to recover from e.g. a power failure in future, on receipt of a database query, a process or thread prepares descriptions of changes being made (or to be made) to the database and writes these change descriptions in a "journal" or "log" (such as a redo log, undo log or transaction log), which is written persistently, e.g. on disk. Disk is a storage device that uses moving parts made of magnetic materials, to store the change descriptions persistently, so that when power returns, the database management system can use them if necessary. This recovery ability imposes a need for each process or thread to wait for completion of writing of the change descriptions to persistent storage, before continuing. For more information, see U.S. Pat. No. 9,418,129 entitled "Adaptive High-Performance Database Redo Log Synchronization" by Chi Cao Minh et al, issued on Aug. 16, 2016 which is incorporated by reference herein in its entirety, as background.

Instead of using a disk to store change descriptions of database transactions persistently across events of power loss, it is possible to use non-volatile memory which has no moving parts. Writes to non-volatile memory can be completed faster than writes to disk. One type of non-volatile memory is flash memory, which is typically built using NAND gates and/or NOR gates. Another type of non-volatile memory is persistent memory, which may be built using 3D XPOINT technology developed by IM Flash Technologies, LLC, available from INTEL CORPORATION in OPTANE™ technology products, and also available from MICRON TECHNOLOGY, INC. Persistent memory is also available from Hewlett Packard Enterprise e.g. "HPE Scalable Persistent Memory" available in conjunction with "HPE ProLiant DL380 Gen10 server" products. Persistent memory of some kinds may contain chalcogenide glass or other phase change material.

Writes to persistent memory can be completed faster than writes to flash memory. As non-volatile memory in the form of persistent memory can be written faster than disk and flash, there is a need for improvement in how processes and/or threads operate, to benefit from the higher speed of persistent memory, as described below.

SUMMARY

A computer in accordance with the invention executes multiple processes or threads or processes and threads (also called "database" processes and/or threads), which when committing a transaction to a database during normal operation, generate and store into one or more contiguous regions (also called "log buffers") in main memory (e.g. DRAM), data to log the transaction. This data includes, for example, data to re-do (or re-implement) and/or un-do (or reverse) the transaction depending on whether the transaction is or is not committed (and used in case the database is to be recovered after a failure). Thereafter, this data (hereinafter "redo/undo" data) is retrieved from the log buffer(s) and written to a non-volatile storage device, which includes persistent memory (also called "persistent memory storage"), by a different process (also called "log writer" process). After storing its redo/undo data in a log buffer, each of the database processes (or threads) checks if its redo/undo data has been written to persistent memory storage (also referred to as "persisted"). If on this check (also called "initial" check), the redo/undo data is found to be not persisted, each database process (or thread) waits for its redo/undo data to be persisted. This waiting includes at least a sleep phase, and additionally a spin phase which is entered if after awakening from sleep and repeating this check (called "on-awakening" check), the redo/undo data is found to not have been persisted.

To sleep in the sleep phase, a database process (or thread) specifies a sleep duration. A current value of the sleep duration is determined based at least partially on previous results of the on-awakening checks (described above). Specifically, in some embodiments, certain previous results of on-awakening checks, in which redo/undo data was found to be not persisted, are used as indications that the sleeps which preceded these checks were insufficient in duration. These indications (also called "under-sleep events") are counted in such embodiments, and used to automatically determine the current value of the sleep duration (which is specified to sleep in the sleep phase, as noted above). After the sleep phase, each database process (or thread) performs an on-awakening check, and current result(s) of such check(s) by the multiple processes (and/or threads) are used to determine a new value of the sleep duration. Repeated determination of the sleep duration's current value, e.g. by a housekeeper process (described below), makes the sleep phase adaptive. Although some embodiments use under-sleep events as just described, alternatively embodiments may count other previous results that find the redo/undo data is persisted (instead of not persisted) by the on-awakening checks, and use them as indications their preceding sleeps were sufficient (also called "over-sleep events"), and based thereon determine a current value of sleep duration.

In some embodiments, the sleep duration (also called "API sleep duration"), is automatically changed repeatedly over time, e.g. by a housekeeper process that executes periodically or aperiodically or a combination thereof. Automatic changing of the API sleep duration enables an actual time at which a database process or thread is awakened to better match a time at which its redo/undo data's persistence completes, in contrast to using a fixed sleep duration which cannot be changed.

Changing of sleep duration (also called "API sleep duration") based at least on counting "no" results (or "yes" results in alternative embodiments) of on-awakening checks avoids use of duration of any particular activity (e.g. duration of writes to persistent memory), and enables the sleep phase to be (1) automatically increased, when writes to persistent memory storage are taking more time than recently completed sleeps and (2) automatically decreased, when writes to persistent memory storage are taking less time than recently completed sleeps. This adaptive nature of the sleep phase makes a process/thread responsive to completion of persistence of its data, even when persistent memory storage is used, although writes to persistent memory storage are faster than writes to flash memory and writes to disk. The acronym "API" denotes "application programming interface".

Moreover, changes to API sleep duration, based on previous results of on-awakening checks as described above, automatically reduces a difference between an amount of time to write to persistent memory storage and an actual duration after which a process/thread is awakened, even though this actual duration includes an "overhead duration" (also called "sleep overhead") required by the operating system to allocate a processor. The just-described difference can vary for any reason, when the API sleep duration is made small (e.g. 60 microseconds). Despite variability of the just-described difference, making the sleep phase adaptive as described above makes a process/thread responsive to completion of writes of data to persistent memory storage, thereby to reduce usage of the spin phase (and thus, unnecessary spinning).

In the above-described spin phase, a database process or thread checks repeatedly (also called "spin-phase" checks), whether its redo/undo data has been persisted and does so without relinquishing its processor between one or more repetitions of this check. The spin phase has the advantage of responding to persistence completion faster than any other action (e.g. additional sleep followed by checking), and is appropriate due to a high likelihood that persistence will complete soon (given the time already spent in the sleep phase). In a few situations, when persistence does not complete soon after the sleep phase ends, the repeated checks in the spin phase are performed until a limit is reached, after which an exception handling phase is entered. In the exception handling phase, depending on the embodiment, a combination of sleep and check for persistence may be performed repeatedly, with the sleep duration being successively increased, in each repetition.

It is to be understood that several other aspects of the described embodiments will become readily apparent to those skilled in the art from the description herein, wherein it is shown and described various aspects by way of illustration. The drawings and detailed description below are to be regarded as illustrative in nature and not as restrictive.

DETAILED DESCRIPTION

Figure 1:
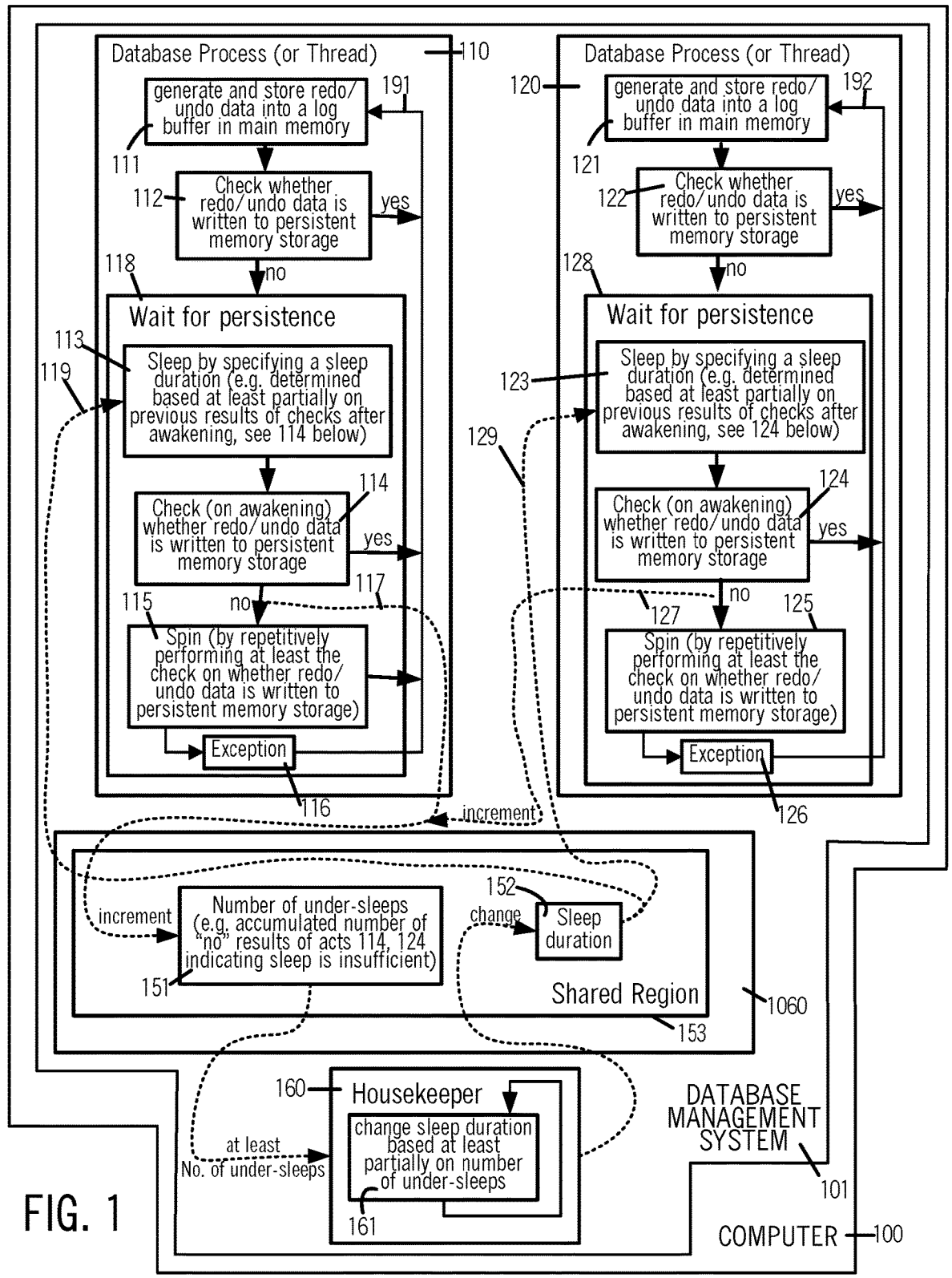
FIG. 1 illustrates, in a high level diagram, acts performed by multiple processes and/or threads 110, 120 to wait for persistence, by specifying a sleep duration 152 that is automatically determined by housekeeper process 160, based at least partially on a count of under-sleep events accumulated in a storage location 151 in shared memory region 153 in main memory 1060, in some embodiments of the invention.

In several embodiments of the type shown in FIG. 1, in a computer 100, each sequence of acts, such as act 111 and operation 118 in sequence 110, may be executed by one of multiple processors (e.g. see processors 1041-1044 in FIG. 3), in a process which has no threads, or alternatively in a thread of a process, or alternatively in any combination of threads and/or processes. Although the following description refers to each of sequences 110, 120 and 160 (see FIG. 1) as a process, it is to be understood that the same description applies to a thread, unless stated otherwise. In the embodiments illustrated in FIG. 1, processes 110, 120 and 160 are included in a database management system 101 (such as Oracle Database 18c, available from Oracle Corporation) that is installed in and executes in computer 100. Processes 110 and 120 are also referred to below as "database" processes (or threads), although in alternative embodiments one or more of processes 110 and 120 may be parts of any other application and/or parts of an operating system (instead of being included in database management system 101).

Processor 1041 (shown individually in FIGS. 6 and 7A) may execute any one of processes 110, 120 and 160 in a time shared manner with any other of processes 110, 120 and 160, e.g. as a central processing unit (CPU) that executes instructions in software. Moreover, depending on the embodiment, instead of processor 1041, any of one or more additional processors 1042-1044 in computer 100 (FIGS. 6 and 7A) may execute one or more of act 111 or wait operation 118 of process 110. Unless described otherwise below, which of processors 1041-1044 are used by computer 100 to execute which of processes 110, 120 and 160, can be different in different embodiments and/or at different times.

In acts 111 and 121 (FIG. 1), database processes 110 and 120 generate certain data related to logging the performance of transactions on a database 1002 (FIG. 6), and store this data ("update" data) into one or more log buffers, in main memory 1060 which may include, e.g. dynamic random access memory (DRAM). The update data which is generated and stored in acts 111 and 121 may include, for example, the data to be used in re-doing (or re-implementing) the transactions (e.g. redo data) and/or data to be used in un-doing (or reversing) the transactions (e.g. undo data), hereinafter "redo/undo data", whenever database 1002 is to be recovered, e.g. after a failure, such as a power loss. This redo/undo data (or more generically, any "update" data) is retrieved from the log buffer(s) by a different process (e.g. by process 317 in FIG. 3) which writes this data to persistent memory storage (e.g. storage 1070 in FIG. 3), which is a non-volatile storage device that stores its written data permanently (e.g. when power is turned off). In alternative embodiments wherein processes 110 and 120 are parts of any other application and/or parts of an operating system, the update data described in this paragraph may be any other data, which is unrelated to recovery of database 1002.

Next, in acts 112 and 122 (FIG. 1), processes 110 and 120 check if their respective redo/undo data is written to persistent memory storage (also referred to as "persisted"). If on performing this check (also called "initial check"), the respective redo/undo data is found to be not yet persisted, processes 110 and 120 wait (in operations 118 and 128 respectively), until the data is persisted (by e.g. process 317 in FIG. 3). The wait (in operations 118 and 128) includes at least a sleep phase, e.g. implemented by performing acts 113 and 123 (FIG. 1). Acts 113 and 123 may be performed, e.g. by making a sleep( ) system call to an operating system, and in making this call specifying sleep duration 152. Sleep duration 152, which is retrieved from a specific location in shared memory region 153 (as illustrated by dashed arrows 119 and 129) by acts 113 and 123, is repeatedly determined automatically (e.g. in act 161 by housekeeper process 160, described below), based at least partially on previous results of checks on awakening from sleep (performed in acts 114, 124, see below). Initially, at startup of database management system 101, the previous results of acts 114, 124 are not available, so sleep duration 152 is set to an initial value, which may be configured manually in some embodiments.

In response to awakening from sleep, each process or thread 110, 120 checks (in act 114, 124) if its redo/undo data has been persisted (also called "on-awakening check"). If any process 110, 120 finds that its respective redo/undo data has been persisted, the answer of the on-awakening checking (in act 114, 124) is yes and its wait is completed, so that particular process (e.g. process 110 or process 120) goes from act 114 or 124 to act 111 or 121 (via branch 191 or 192). If the answer of the on-awakening checking (in act 114, 124) is no, the wait in operation 118 or 128 continues, in one or more additional phases (described below), until the respective redo/undo data is persisted. To continue this wait (also called "multi-phase" wait), the process (e.g. process 110 or 120) enters at least a spin phase (e.g. by performing act 115 or 125).

In addition to determining that the wait needs to continue, a current result of "no" to the on-awakening check (in act 114 or 124) is used (as shown by dashed arrows 117 and 127 in FIG. 1) in some embodiments, to increment a number 151 that is globally accessible and stored in a shared region 153 in memory 1060. Number 151 is incremented by processes 110, 120 to count under-sleep events, which are defined to occur when the results of on-awakening check in acts 114, 124 are no, indicating the corresponding sleeps were insufficient in duration.

Number 151 is used by housekeeper process 160 in determining a new value of sleep duration 152, e.g. by at least changing a current value of sleep duration 152 by an adjustment in act 161 (FIG. 1), wherein the adjustment is identified by using number 151 (either alone or in combination with other such numbers). The new value of sleep duration 152 is specified to sleep in future waits, e.g. when any of acts 113 and 123 is again performed by database process 110, 120 (after returning via branch 191 or 192 to act 111 or 121), or performed by a new database process. Automatic changing of sleep duration 152 makes synchronization between the time of awakening after sleep by processes 110, 120 and the time taken for persistence of their respective redo/undo data, adaptive.

Whichever process 110 or 120 enters the spin phase, performs act 115 or 125 (FIG. 1) in which it repeatedly checks whether its respective redo/undo data has been persisted, and when the answer is yes, the wait is completed, so that particular process (e.g. process 110 or process 120) returns to act 111 or 121 (via branch 191 or 192). The repeated checking in act 115 or 125 is performed after the on-awakening check and finding its result is no (as described above in reference to act 114 or 124). In some embodiments, this spin phase is limited by a time period (e.g. as described below in reference to act 443), and when the limit is reached with the redo/undo data not yet persisted, the multi-phase wait continues in an exception handling phase, e.g. by performing act 116 or 126, followed by returning to act 111 or 121 (via branch 191 or 192).

A specific manner in which exception handling is performed in act 116 or 126 (FIG. 1) can be different depending on the embodiment (some embodiments are described below, in reference to acts 451-453 in FIG. 4). Moreover, the spin phase in act 115, 125 (FIG. 1) described above may be limited in other ways in other embodiments (e.g. by a limit on number of iterations), or alternatively in still other embodiments this spin phase may continue without limit until the redo/undo data is persisted. Furthermore, the above-described on-awakening check (in act 114, 124) may be performed by each process or thread 110, 120 immediately after it awakens from sleep (in act 113, 123) without any intervening act there-between in some embodiments, although in other embodiments each process or thread 110, 120 performs one or more intervening acts that are unrelated to persistence checking, between awakening from sleep (in act 113, 123) and the on-awakening check (in act 114, 124).

Certain embodiments of computer 100, wherein database processes or threads 110, 120 at least increment number 151 in shared region 153 and at least use sleep duration 152 (which is generated by housekeeper 160) to wait for persistence of respective update data (in operations 118 and 128), implement a synchronization mechanism that balances several factors: (a) need for responsiveness to fast writes provided by persistent memory storage, whereby the time to synchronize is small, (b) if spinning is used for responsiveness, need to avoid CPU saturation from spinning by multiple database processes or threads, (c) if sleep is used, need to ensure responsiveness, (d) handling variance of sleep, when the duration of sleep is very small, and (e) how to match actual sleep to a particular duration of sleep.

Figure 2:
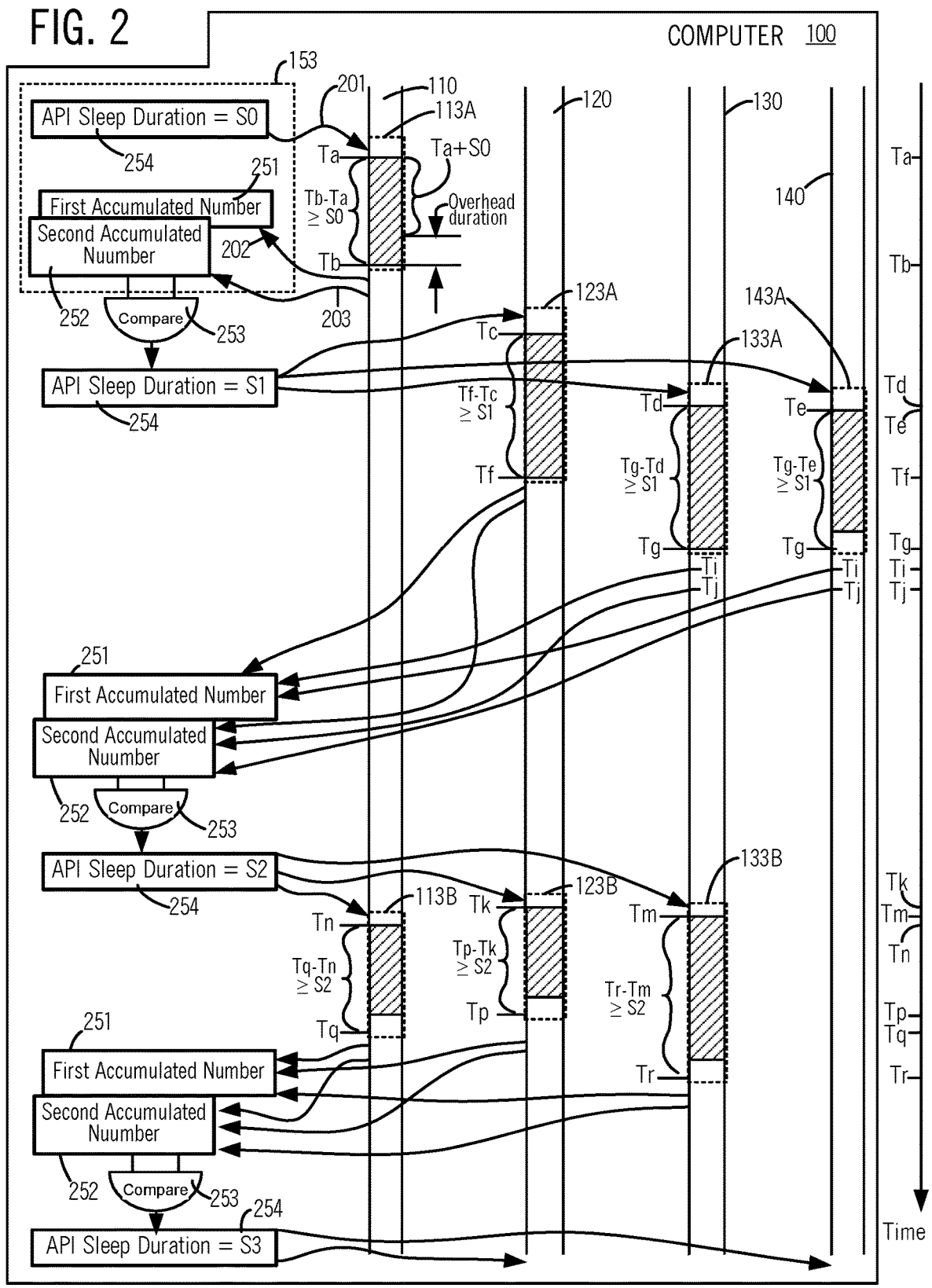
FIG. 2 illustrates, in a timing diagram, execution of processes or threads 110-140 including steps of sleeping, by specifying the API sleep duration 254 of different values S1, S2 and S3 that are determined repeatedly (e.g. by housekeeper process 160), based on comparison of first and second accumulated numbers in memory locations 251 and 252.

Although a single number 151 is described above (and shown in FIG. 1), two such counters are maintained in a system-wide manner in certain embodiments, by one or more processes/threads 110, 120 of database management system 101, e.g. as shown in FIG. 2 (described next). Specifically, a first accumulated number (to count "total" waits for synchronization) at one location 251 (FIG. 2) in main memory 1060 is incremented whenever a process (or thread) 110, 120 waits, e.g. on entry to the sleep phase. The just-described first accumulated number at location 251 is in addition to a second accumulated number (to count "under-sleep" events) at another location 252 (FIG. 2) in main memory 1060.

This second accumulated number at location 252 is incremented as noted above for number 151 in FIG. 1, specifically whenever a process (or thread) 110, 120 finds on completion of the sleep phase of waiting in operation 118, 128 that it under-slept and enters the spin phase. The just-described second accumulated number (e.g. of "under-sleep" events) at location 252 is not incremented when process (or thread) 110, 120 finds its redo/undo data has been persisted, when it checks on awakening from sleep. In embodiments that maintain the first and second accumulated numbers as just described, housekeeper process 160 compares them to one another (e.g. by forming a ratio, by dividing the second accumulated number with the first accumulated number), and uses an outcome of this comparison, to change the API sleep duration.

Instead of incrementing the second accumulated number to count under-sleep events as described above, alternative embodiments may increment the second accumulated number when a process (or thread) finds on awakening from the sleep phase that its redo/undo data is persisted, which is an indication that it over-slept. In the just-described alternative embodiments, housekeeper process 160 also compares this second accumulated number with the above-described first accumulated number, and uses the outcome of this comparison to adjust the API sleep duration, although the direction of adjustment (i.e. whether increase or decrease) is different when over-sleep events are used to increment the second accumulated number (instead of incrementing on under-sleep events, as described in the previous paragraph above). In the following description of FIG. 2, the second accumulated number is referred to as an "event counter" which is incremented on finding that a specific type of event occurred (e.g. that an under-sleep event occurred in certain embodiments, or that an over-sleep event occurred in alternative embodiments). The first accumulated number is also referred to herein, as a "total counter."

In some embodiments, as illustrated in FIG. 2, computer 100 includes a comparator 253 that compares the two accumulated numbers in memory locations 251 and 252, and uses an outcome of comparison to adjust API sleep duration 254, and does so repeatedly over time as illustrated in FIG. 2. A specific manner in which the outcome of comparison is used to determine API sleep duration 254 can be different in various embodiments, although in some embodiments this outcome is used (directly or indirectly) to automatically identify an adjustment, from among multiple constants (e.g. in a table). This adjustment is applied to a current value of the API sleep duration 254 to obtain a new value, and such a change may be repeated periodically (or aperiodically, depending on the embodiment). In the embodiments illustrated in FIG. 2, API sleep duration 254 is similar or identical to sleep duration 152 (described above) and is specified by processes 110 and 120 (described above), and similar processes 130 and 140 in making a call to the operating system, such as a sleep( ) system call. Although use of a sleep( ) call is described to sleep in a wait operation, processes 110-140 of other embodiments may relinquish their processors in any other manner.

In response to a sleep( ) call by any process (e.g. process 120) in the embodiments of FIG. 2, the operating system puts that process (e.g. process 120) into a queue of sleeping processes (called "not-runnable" queue), for the specified API sleep duration 254, after which the operating system allocates a processor to that process (e.g. process 120) whenever one becomes available (until which time that process is kept in a runnable queue). As readily apparent, while waiting in the not-runnable queue and also while waiting in the runnable queue, the waiting process does not use any processor. The amount of time spent by any process in the runnable queue is included in a part of actual sleep that is attributable to the operating system called "overhead duration" (or "sleep overhead") which varies depending on processing load. So, the actual amount of time for which any process (e.g. process 120) is in a non-running state, is a sum of (a) API sleep duration specified in the call to the operating system and (b) overhead duration (or sleep overhead) required by the operating system to allocate a processor.

As illustrated in FIG. 2, an execution 113A (of act 113 of process 110 in FIG. 1) starts before time Ta and loads API sleep duration 254 as shown by arrow 201, e.g. into a register from memory 1060. Before loading by process 110, API sleep duration 254 has a value S0, which may be an initial value, e.g. 60 microseconds. After loading value S0, execution 113A of process 110 performs a specific step, e.g. sleeping, by making the sleep( ) system call to the operating system with sleep duration of S0, at time Ta. In response, the operating system puts process 110 into the not-runnable queue (not shown). Subsequently, at a later time Tb, which occurs after an overhead duration following Ta+S0, the operating system allocates a processor to process 110. Then, process 110 completes execution 113A of act 113, followed by incrementing the first and second accumulated numbers in memory locations 251 and 252 in memory 1060, e.g. to values TOTAL_COUNT_1 and EVENT_COUNT_1 respectively.

In the example of FIG. 2, memory location 251 is incremented on performing each wait (also called "total counter"), e.g. in response to the wait in operation 118 or 128 (FIG. 1). So, shortly after time Tb, the first accumulated number in memory location 251 is incremented by 1 (e.g. as shown by arrow 202) to value TOTAL_COUNT_1. The second accumulated number in memory location 252 is incremented by 1 (e.g. as shown by arrow 203) in response to a specific event having been determined to have occurred (also called "event counter"). An example of a specific event in the embodiments of FIG. 2 is lack of completion of persistence after awakening from sleep (indicating an under-sleep event), although in alternative embodiments the specific event is completion of persistence on awakening from sleep (indicating an over-sleep event). This a particular type of event (e.g. under-sleep event or alternatively over-sleep event) which is used to increment the event counter in memory location 252, depends on the embodiment. Hence, the description (see below) of event counter in memory location 252, is generic to and equally applicable to (1) embodiments in which under-sleep events are used to increment it or (2) alternative embodiments in which over-sleep events are used to increment it.

Also, although in the embodiments of FIG. 2, a specific event occurs on awakening from sleep and finding the lack of completion (or alternatively completion) of persistence (e.g. by a write to persistent memory storage 1070 in FIG. 3), in alternative embodiments the specific event may be defined to occur on awakening from sleep and finding lack of completion (or alternatively completion) of a different operation wherein processes 110 and 120 wait for completion of the different operation in multiple phases, including at least a sleep phase followed by a spin phase. In the just-described alternative embodiments, occurrence of this specific event is determined by a process (or thread) when it resumes execution after the sleep phase, and used to increment the event counter in memory location 252, to count an under-sleep event (or alternatively an over-sleep event, depending on the embodiment).

Referring to FIG. 2, occurrence of the specific event is determined by process 110, after it resumes execution on awakening from sleep, and in the above-described example, after execution 113A. So, shortly after time Tb, the second accumulated number in memory location 252 is incremented to value EVENT_COUNT_1. The values EVENT_COUNT_1 and TOTAL_COUNT_1 are then compared to one another by comparator 253 which uses an outcome of the comparison to determine and store new value S1 as API sleep duration 254. Comparator 253 is included in housekeeper process 160 of several embodiments (as described below), and used to implement act 161 (FIG. 1). In other embodiments, comparator 253 (FIG. 2) may be included in any process, such as one or more processes 110, 120, 130 and 140, which may individually (or in coordination with one another, depending on the embodiment) change API sleep duration 254 over time, periodically (or aperiodically).

Moreover, a specific manner in which new value S1 is determined by use of the comparison's outcome is different, in different embodiments. In some embodiments described below, new value S1 is determined by at least using an adjustment (either an increment or a decrement), which may be, for example, looked up from a table with the comparison's outcome as an index. In certain embodiments, at least the comparison's outcome and the value S0 are used as inputs to a procedure (e.g. see acts 520-522 in FIG. 5 described below), to determine new value S1. Alternative embodiments may determine new value S1 by using the comparison's outcome, but without using value S0.

Referring to FIG. 2, this new value S1 of API sleep duration 254 is loaded by processes 120, 130 and 140 shortly before respective times Tc, Td and Te, for use in performing the specific step of sleeping (thereby to relinquish their respective processors). Specifically, in executions 123A, 133A and 143A (FIG. 2), processes 120, 130 and 140 make the sleep( ) system call to the operating system, with sleep duration of S1. In response, the operating system puts processes 120, 130 and 140 into its not-runnable queue. Subsequently, at later times Tf, Tg and Tg, processors are allocated to processes 120, 130 and 140. Then, processes 120, 130 and 140 complete executions 123A, 133A and 143A, followed by incrementing (e.g. by 1) the first and second accumulated numbers in memory locations 251 and 252, e.g. to values TOTAL_COUNT_2 and EVENT_COUNT_2 respectively.

Depending on the embodiment, the first and second accumulated numbers in memory locations 251 and 252 may be incremented by processes 110-140 without synchronizing their changes with one another (which can result in loss of accuracy, but has the advantage of no waiting) or alternatively after locking one another (which ensures accuracy, but may require waiting for a lock to be released). In an illustrative example shown in FIG. 2, memory locations 251 and 252 are incremented without locking, and processes 130 and 140 may both increment memory location 251 at exactly the same time Ti (i.e. simultaneously), causing the first accumulated number in memory location 251 to incorrectly identify the number of times it is incremented (e.g. less by 1). Two simultaneous increments at the same time Ti to the first accumulated number in memory location 251 may be made possible by execution of processes 130 and 140 in two processors independent of one another, e.g. by processors 1042 and 1044, and use of multiple ports allows memory location 251 to be simultaneously accessible. Other embodiments may implement processes 110-140 to lock out one another in a light-weight fashion when incrementing the accumulated numbers in memory locations 251 and 252. Light-weight locking may be implemented, for example, by first acquiring a latch before incrementing the accumulated numbers and memory, and releasing this latch when done.

Referring to FIG. 2, values EVENT_COUNT_2 and TOTAL_COUNT_2 in memory locations 251 and 252, even if made inaccurate by lockless incrementing as described above, are believed to be sufficiently accurate to perform a comparison to one another (e.g. by forming a ratio). Comparison reduces the effect of inaccuracies in these two values, which makes the comparison's outcome useful in adjusting API sleep duration 254. So, these two values are compared by comparator 253 (FIG. 2), which determines and stores a newer value S2 as API sleep duration 254. Then, processes 110, 120 and 130 make the sleep( ) system call to the operating system, with sleep duration of S2, in executions 113B, 123B and 133B, and these processes are put to sleep at times Tn, Tk and Tm (FIG. 2). At times Tq, Tp and Tr, processors are allocated to processes 110, 120 and 130, which then complete respective executions 113B, 123B and 133B, followed by incrementing memory locations 251 and 252, e.g. to values TOTAL_COUNT_3 and EVENT_COUNT_3 respectively. Values TOTAL_COUNT_3 and EVENT_COUNT_3 are then used by comparator 253 to change API sleep duration 254 to a newest value S3. This newest value S3 is used by processes 120 and 140, as described above.

In some embodiments, API sleep duration 254 (FIG. 2) which is specified by a process (e.g. process 120) in making a sleep( ) call is so small that the overhead duration (or sleep overhead) is significant relative to API sleep duration 254, e.g. duration 254 may be 90% of overhead duration or it may be 10× of overhead duration. Hence, in certain embodiments, because it is not insignificant, overhead duration that is currently observed (e.g. an average over multiple sleeps) is used, although this usage is only to determine an upper limit on API sleep duration 254 (and not to determine its value subjected to this upper limit, which value is obtained by applying an adjustment to a current value). Assume writing of redo/undo data to persistent memory storage takes an average of M microseconds, and the overhead duration is, on average, N microseconds, then the API sleep duration can be set to (M-N). But, instead of using this formula, some embodiments use a procedure (e.g. described below in reference to FIG. 5) that compares a percentage of under-sleeps to a target percentage, and based on an outcome of this comparison, decreases or increases a current value of API sleep duration, in a direction and by an amount (also called "adjustment"), to move the under-sleep percentage towards the target percentage. This procedure (see act 516 in FIG. 5) uses overhead duration (or sleep overhead) to determine an upper limit on API sleep duration, but does not otherwise relate the duration that a process (or thread) is expected to sleep (including overhead duration) and a value that is used for API sleep duration.

Figure 3:
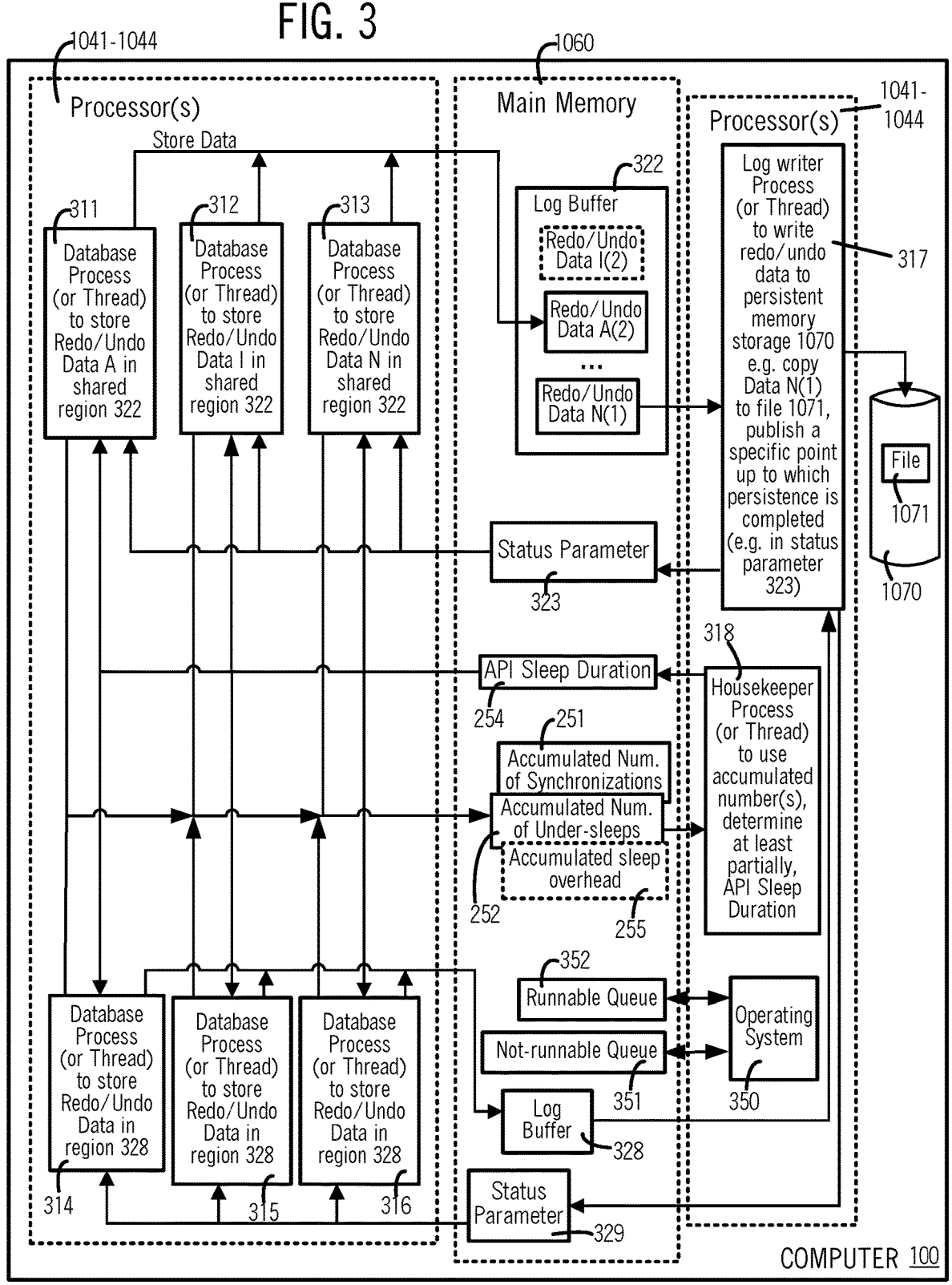
FIG. 3 illustrates, in a high level block diagram, a computer 100 that includes log buffers 322 and 328 and three accumulated numbers in memory locations 251, 252 and 255 in a main memory 1060, and processes and/or threads 311-316, 317 and 318 executed by one or more processor(s) 1041-1044, in some embodiments of the invention.

The above-described incrementing of memory locations 251 and 252 without locking, and use of API sleep duration 254 (which is repeatedly determined at least partially based on the first and second accumulated numbers in memory locations 251 and 252), is performed in some embodiments, by database processes 311-316 (FIG. 3). Database processes 311-316 of these embodiments are programmed to perform the acts illustrated in FIG. 4. In the following description, for ease of discussion, any of database processes 311-316 (FIG. 3) is sometimes referred to generically as process 401 (FIG. 4).

Figure 4:
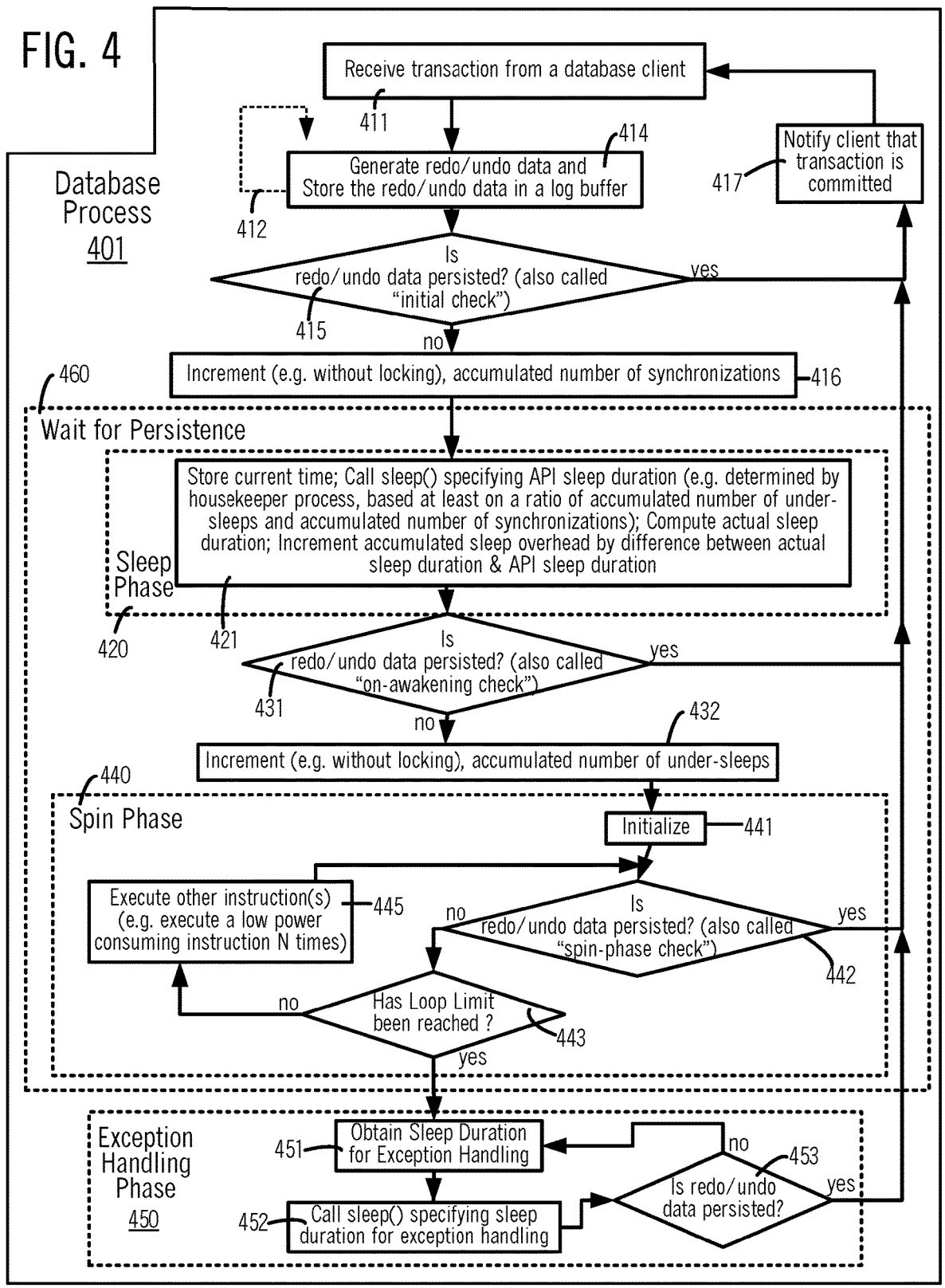
FIG. 4 illustrates, in a flow chart, acts performed by a process 401 that generically illustrates acts performed by each of database processes 311-316 of FIG. 3, in certain embodiments.

Each of database processes 311-316 (FIG. 3) receives a transaction from a database client (e.g. process 181 in client computer 610 in FIG. 6) as shown by act 411 in FIG. 4 and generates and stores redo/undo data (which is specific form of "update" data) in a normal manner, e.g. as shown by act 414 in FIG. 4. In some embodiments, a transaction that is received in act 411 is expressed as a statement in the structured query language SQL, and the redo/undo data generated in act 414 may include one or more descriptions of database changes (e.g. re-do or un-do), to implement the transaction on a database accessible through a relational database management system (RDBMS). Each database change description generated in act 414 may be associated with a logical time stamp (or other such number) which defines an order across a sequence of these descriptions (which may be in the form of, e.g. change records).

After act 411 (FIG. 4), database processes 311-316 (FIG. 3) store their respective redo/undo data in a log buffer 322, 328 of main memory 1060 (FIG. 3), e.g. as shown by act 414 in FIG. 4. Each of log buffers 322, 328 (FIG. 3) includes a contiguous region of memory 1069. The redo/undo data (e.g. data N(1), A(2), I(2) in FIG. 3) may include one or more change records (as described above). In storing redo/data (e.g. data N(1), A(2), I(2) in FIG. 3) into a log buffer 322, each of processes 311-313 ensures, in a normal manner, that its respective data is not inadvertently overwritten by another of processes 311-313 (e.g. by use of a lock or other such mutex mechanism).

As noted above, the redo/undo data (e.g. data N(1), A(2), I(2) in FIG. 3) is retrieved from log buffer 322 and written to a file 1071 (FIG. 3) in persistent memory storage 1070 by another process 317 (FIG. 3), which executes independently relative to processes 311-316. In file 1071 (FIG. 3), process 317 (also called "log writer" process) implements a transaction log (also called transaction journal, database log, database transaction log, binary log or audit trail), which in some embodiments, contains information on changes made to database 1002 by database management system 101. File 1071 may be used to implement atomicity, consistency, isolation and durability (ACID) properties by re-doing transactions, when recovering database 1002 (FIGS. 6, 7A) from crashes, hardware failures and accidental power loss in computer 100. Log writer process 317 (FIG. 3) publishes a specific point, up to which persistence is completed, e.g. in status parameter 323, thereby to identify which of the redo/undo data in log buffer 322 has been written to persistent memory storage 1070.

Persistent memory storage 1070, to which log writer process 317 writes the redo/undo data, is non-mechanical and has no moving parts. Specifically, persistent memory, which is included in storage 1070 may be implemented, in some embodiments, as a three dimensional array of memory cells located at intersections of word lines and bit lines, in which storage is based on a change in bulk resistance, making it byte addressable. The just-described persistent memory (in storage 1070) may be built using 3D XPOINT technology developed by IM Flash Technologies, LLC, available from INTEL CORPORATION in OPTANE™ technology products, and also available from MICRON TECHNOLOGY, INC, and from Hewlett Packard Enterprise. In other embodiments, the persistent memory (in storage 1070) may contain chalcogenide glass or other phase change material. Any other such material may be used to implement the persistent memory (in storage 1070). Although some embodiments of computer 100 include persistent memory (in storage 1070), other embodiments of computer 100 may store file 1071 in other forms of non-volatile memory (in storage 1070), e.g. flash memory including NAND gates and/or NOR gates. The above-described specific point (in status parameter 323) that is published by log writer process 317 is checked, to determine if the respective redo/undo data (also called "update" data) has been persisted, by each database process 313, 311, 312 initially in an act 415 (see FIG. 4), e.g. immediately after storing the respective redo/undo data into log buffer 322 in act 414. This initial check is useful in certain implementations of computer 100 wherein under certain circumstances, log writer process 317 may complete persistence of some redo/undo data quickly, even by the time the initial check is performed by a process 401 that stored the data (e.g. one of processes 311-316). In such implementations, if this initial check determines that the redo/undo data has been persisted (see act 415 in FIG. 4, the answer is yes), whichever process 311-316 (also called process 401) performed this initial check continues to execute, e.g. goes to act 417 (FIG. 4) to notify the client from which the transaction was received that the transaction has been committed and then returns to act 411.

In some embodiments, in executing a transaction received in act 411 (FIG. 4), database process 401 may perform act 414 multiple times (as shown by arrow 412) e.g. to generate and store redo/undo data for multiple DMLs within the transaction, followed by ensuring persistence of the logged redo/undo data (e.g. by performing acts 415, 416, multi-phase wait 460, and exception handling phase 450 described above) when this transaction is committed.

On returning to act 411, process 401 repeats its performance of acts 411-453 for each transaction that is received thereafter. During this repeated performance, whenever sleep phase 420 is to be additionally performed, process 401 specifies a new value of API sleep duration 254 after the new value has been determined (e.g. by housekeeper process 318, as described below). Specifically, process 401 receives an additional transaction in act 411, additionally generates new redo/undo data to be persisted, and additionally stores the new respective redo/undo data in a log buffer (e.g. in act 414) and if necessary additionally waits for the new respective redo/undo data to be written to persistent memory storage 1070, at least by additionally sleeping by specifying the new value, e.g. in calling sleep( ).

On performing the initial check (in act 415 in FIG. 4), if the answer is no, whichever process 311-316 (also called process 401) performed this check must wait, so process 401 goes to act 416 to increment an accumulated number of synchronizations in memory location 251 (FIG. 3), followed by a multi-phase wait 460 (FIG. 4) which includes sleep phase 420 (described below), followed by additional waiting if needed (also described below) in spin phase 440 (as further described below). The accumulated number of synchronizations in memory location 251 (FIG. 3) is initialized to 0 at startup of database management system 101, and then incremented globally in a system-wide manner, each time one of processes 311-316 (also called process 401) executes a sleep( ) system call.

After act 421 (FIG. 4), process 401 (e.g. a specific one of processes 311-316 which must wait for persistence of its redo/undo data) enters sleep phase 420, by performing an act 421 (FIG. 4). In act 421 of some embodiments, process 401 stores the current time for later use (after awakening from sleep), to calculate actual sleep duration, and then calls the sleep( ) function of operating system 350, specifying the API sleep duration 254 (see FIG. 3). API sleep duration 254 (FIG. 3) which is changed in act 421 (FIG. 4) is changed repeatedly, e.g. periodically or aperiodically or a combination thereof, by housekeeper process 318 (FIG. 3). Housekeeper process 318 of some embodiments computes a ratio between the accumulated number of under-sleeps in memory location 252 and the accumulated number of synchronizations in memory location 251, and uses this ratio to index a look-up table to obtain an adjustment (e.g. as described below in reference to act 521 in FIG. 5), which is applied to API sleep duration 254 to determine a new value thereof. Automatic changing of API sleep duration 254 by housekeeper process 318 enables a time by when log writer process 317 completes persistence of redo/undo data to be better matched by the time process 401 resumes execution after the sleep( ) call (with these two times being best matched when the just-described ratio becomes so close to a preset target (such as 0.5) that an adjustment obtained from the look-up table is zero).

In response to the sleep( ) call, operating system 350 (FIG. 3) puts process 401 into its not-runnable queue 351 for at least the specified API sleep duration 254, and then into a runnable queue 352 for at least a portion of the overhead duration, after which the process 401 (FIG. 4) resumes execution. Specifically, the overhead duration (or "sleep overhead") which is attributable to operating system 350 may be partly used in performing the sleep function and partly used in re-scheduling process 401 after its specified API sleep duration elapses. Hence, in act 421 (FIG. 4), process 401 waits in the not-runnable queue 351, for at least the specified API sleep duration 254 (FIG. 3). Then, still in act 421, for at least a portion of the overhead duration, process 401 waits in runnable queue 352 until allocation of a processor, at which time process 401 is awakened. On being awakened, process 401 resumes execution (and this completes the sleep( ) system call) in act 421. Next, process 401 computes the actual sleep duration, e.g. by subtracting from the current time, the time stored at the beginning of act 421. Then, still in act 421 (FIG. 4), process 401 computes the difference between the actual sleep duration (as just computed), and API sleep duration 254 specified in act 421, and then uses this difference (which is sleep overhead, or overhead duration) to adjust an accumulated sleep overhead in memory location 255 (e.g. by increasing a current value with this difference).

Accumulated sleep overhead in memory location 255 is initialized to 0 at the startup of database management system 101, and thereafter increased globally in an system-wide manner by any of processes 311-316, whichever of these processes (also called process 401) performs act 421. Although some embodiments maintain accumulated sleep overhead as just described (in act 421) in memory location 255, for use in a procedure that performs act 514 in FIG. 5, other procedures may compute maximum API sleep duration without using sleep overhead, and in such embodiments act 421 does not compute the actual sleep duration to the maintain accumulated sleep overhead. In some embodiments, the operating system in computer 100 may provide support for multiple sleep functions e.g. one sleep function may be the sleep( ) system call (described above), and another sleep function may be a nanosleep( ) system call with its API sleep duration being specified at a higher resolution. Hence, in some embodiments, process 401 is designed to make the nanosleep( ) system call in act 421, to relinquish its processor. In other embodiments, in act 421, process 401 is designed to call a sleep function that saves a process's state in on-chip registers of processors 1041-1044, so that execution resumption is faster than if the state were saved in cache or in main memory 1060.

Moreover, in certain embodiments, the operating system of computer 100 may provide support for changing a "timer slack" parameter used to delay resumption of execution of a thread (or process), after sleep. Specifically, a nominal value of 50 microseconds is changed for the process (e.g. one of processes 311-316) that performs act 421 in some embodiments to the value of 1 microsecond. In an illustrative implementation, the PR_SET_TIMERSLACK option in the prctl( ) system call is used to change this value, so that process 401 is put into the runnable queue with a delay of less than 1 microsecond after its specified API sleep duration 254. More information is available on the Internet, at an address obtained by replacing "%" with "/" and "," with "." in the string: https:%%linux,die,net%man%7%time.

Referring to FIG. 4, on completion of act 421 the sleep phase 420 ends, and process 401 goes to act 431 (FIG. 4). In act 431, process 401 checks if the redo/undo data that was stored in act 414 has been persisted by process 317, e.g. by checking status parameter 323 (FIG. 3) as described above in reference to act 415 (FIG. 4). If the answer in act 431 is yes, then process 401 goes to act 417 (described above). If the answer in act 431 is no, then process 401 goes to act 432. In act 432, process 401 increments without locking, the accumulated number of under-sleeps in memory location 252, followed by entering spin phase 440 and more specifically goes to act 441 therein.

In spin phase 440, process 401 does not relinquish its processor (e.g. uses its processor until the end of a time slice allocated by operating system 350, when operating system 350 puts process 401 in not-runnable queue 351, in a normal manner for time-shared usage of each of processors 1041-1044). More specifically, in spin phase 440, process 401 uses its processor continuously by executing one instruction or another, thereby to use the processor in a "CPU-intensive" manner. Spin phase 440 ends when the redo/undo data is persisted (e.g. see act 442 described below), or when a loop termination condition is met (e.g. see act 443 described below). In spin phase 440, although its allocated processor is used continuously, process 401 may be programmed to limit its usage of shared memory (which is used in act 442, to load a status parameter, such as parameter 323 or 329), e.g. by performing act 445 described below.

On entering spin phase 440, in act 441 (FIG. 4), process 401 initializes one or more local variables, such as a loop limit, followed by act 442. In certain embodiments, the loop limit is implemented based on a period of time which is a constant (e.g. 300 microseconds), and the loop limit is initialized to a sum of this time period and current time (e.g. wall-clock time) at which act 441 is performed. Instead of a constant as just described, this time period (on which the loop limit is based) may be variable e.g. as described below. In act 442, process 401 checks if persistence has been completed on its redo/undo data that was stored in act 414, e.g. as described above in reference to act 415. If the answer in act 442 is yes, then process 401 goes to act 417 (described above). If the answer in act 442 is no, then process 401 goes to act 443. In act 443, process 401 checks if the loop limit (which was initialized in act 401) has been reached e.g. by comparing the loop limit to current time (and, this current time increases periodically), and if the loop limit is not reached then process 401 goes to act 445.

In act 445, process 401 executes other instructions, e.g. an instruction known to consume less power than an average instruction (e.g. the PAUSE instruction) may be repeatedly executed a fixed number of times, e.g. 500 times, followed by returning to act 442 (FIG. 4). When the answer to the loop limit check in act 443 is yes, process 401 goes into an exception handling phase 450 and more specifically into act 451 therein. The number 500 in the just-described example is selected empirically based on experimental data, as a balance between checking continuously without executing any other instructions in the loop (e.g. the "no" branch of act 442 returning to the beginning of act 442), and checking frequently enough to be sufficiently responsive to completion of the asynchronous operation. For more information on the PAUSE instruction, see, for example, information available on the Internet, at an address obtained by replacing "%" with "/" and "," with "." in the following string: https:%%c9x, me%x86%html% file_module_x86_id_232, html.

In some embodiments, the loop limit in the form of a time period is determined multiple times by process 318 (FIG. 3), which may set the time period equal to a factor*average spin duration, with the factor being determined by process 318 using predetermined criteria, e.g. so that only in a very small percentage of executions of the spin phase 440 (e.g. less than 2%) the looping occurs for this time period. When the loop limit is reached, process 401 takes the "yes" branch out of act 443 and enters exception handling phase 450, and specifically goes to act 451 therein. In alternative embodiments, a loop limit which is initialized in act 441 and used in act 443 may be based on a number of iterations, e.g. 300 iterations (instead of being based on a period of time, as described above).

In act 451, process 401 obtains a sleep duration for exception handling, e.g. by multiplying API sleep duration 254 by a predetermined factor (such as 2), followed by act 452. In act 452, process 401 makes the sleep( ) system call specifying the just-described sleep duration for exception handling. When processing resumes on completion of the sleep( ) system call, process 401 goes to act 453 and checks if the data that was stored in act 414 has been persisted, e.g. as described above in reference to act 415. If the answer in act 453 is yes, then process 401 goes to act 417 (described above). If the answer in act 453 is no, then process 401 goes to act 451. In some embodiments, in each repeated performance of act 451, the sleep duration for exception handling is successively increased (relative to a previous iteration in exception handling phase 450), to implement a back-off.

In some embodiments, at least three accumulated numbers in memory locations 251, 252 and 255 (see FIG. 3) are changed in a system-wide manner by all database processes 311-316, regardless of which log buffer 322, 328 is used by a database process to store its respective redo/undo data because these three numbers are global to all database processes in computer 100. Moreover, although act 416 is shown in FIG. 4 as being performed between acts 415 and 421, in alternative embodiments this act 416 may be performed between acts 421 and 431, or between the yes branch of act 431 and act 417.

In some embodiments, process 317 maintains (a) minimum time to write to persistent memory and (b) average time to write to persistent memory. In such embodiments, these times (a) and (b) may include not only the "I/O time" for writing to persistent memory, but additionally, time for one or more other acts in process 317 (e.g. marking a portion as "closed" before writing, unmarking the marked portion after writing, and updating status parameter 323). The just-described minimum time to write to persistent memory is initialized to zero, followed by being set to the actual write time of the first write to persistent memory storage 1070 of a sequence of redo/undo data records. Thereafter, the minimum time to write to persistent memory is over-written by a current time of performance of an asynchronous operation, when the asynchronous operation takes less time than the minimum time to write to persistent memory. Similarly, the just-described average time to write to persistent memory is initialized to zero, followed by being set to an exponential moving average of the time it takes, from when process 317 started processing a sequence of records of re-do descriptions of a transaction, to when the records had been written to persistent memory and related metadata updated. In several embodiments, the average time to write to persistent memory is not used until it has a non-zero value.

Figure 5:
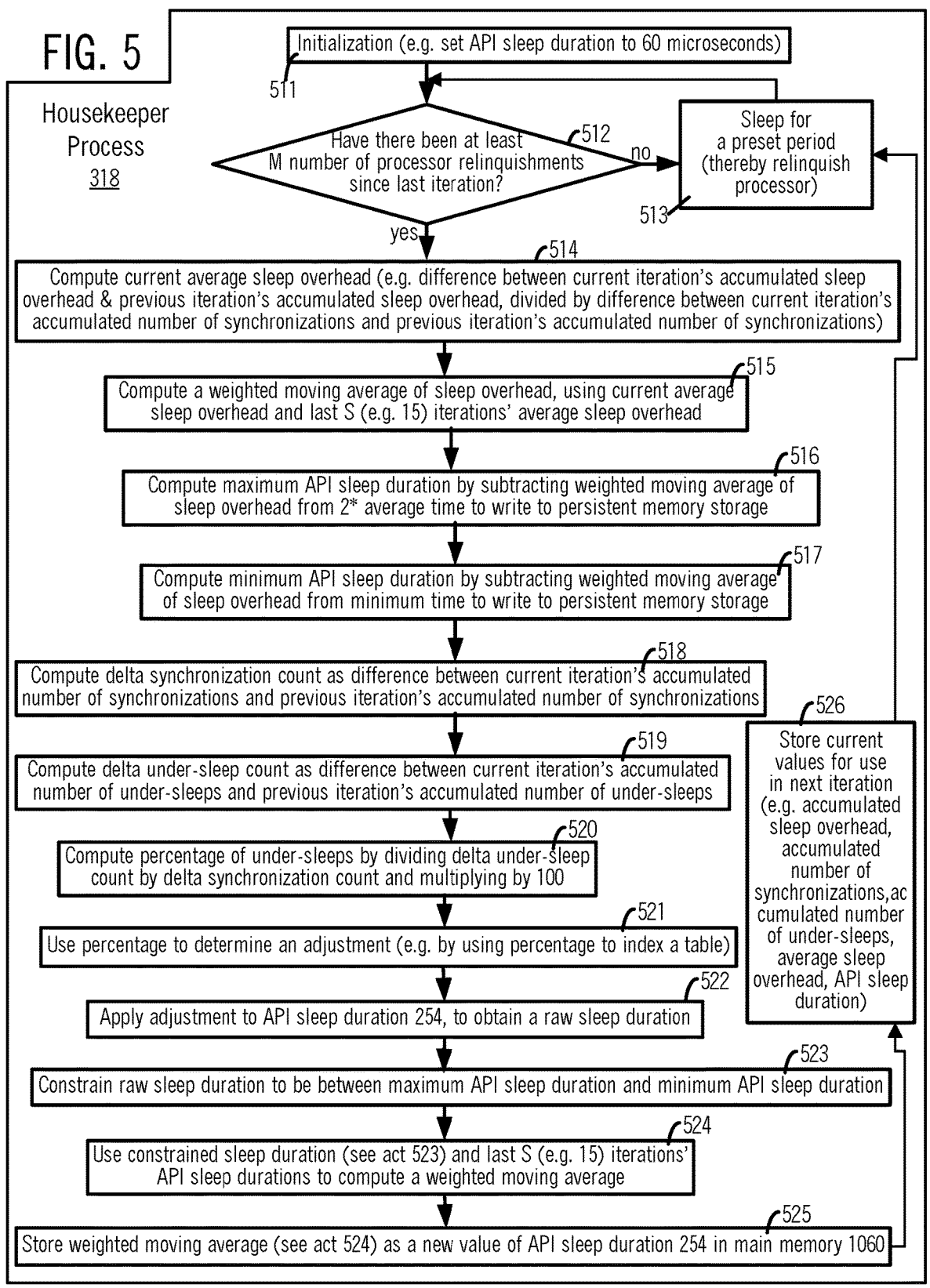
FIG. 5 illustrates, in a flow chart, acts performed by a housekeeper process (or thread) 318 shown at a high level in FIG. 3.

In some embodiments, process 318 performs the acts illustrated in FIG. 5 as follows. Process 318 starts in act 511, and initializes local variables. Then, process 318 performs act 512, by comparing a difference between the previous iteration's accumulated number of synchronizations and the current iteration's accumulated number of synchronizations, to a predetermined number M, which may be, for example 100. If the answer in act 512 is yes, process 318 performs acts 514-526 (described below). If the answer in act 512 is no, process 318 goes to act 513 and relinquishes the processor for a preset period, e.g. 3 seconds, and on resuming execution process 318 returns to act 512. Thus, although process 318 performs act 512 every 3 seconds, it only performs acts 514-526 if there have been at least 100 synchronizations (and therefore 100 sleeps), since the previous time act 512 is executed. Thus acts 512 and 513 prevent process 318 from changing the API sleep duration (by performing acts 514-526), based on too small a sample.

In act 514 (FIG. 5), process 318 computes the current average sleep overhead, e.g. as the difference between the current iteration's accumulated sleep overhead (see memory location 255 in FIG. 3), and the previous iteration's accumulated sleep overhead (which is locally stored by act 526 performed in the previous iteration, described below), divided by difference between current iteration's accumulated number of synchronizations (see memory location 251 in FIG. 3) and the previous iteration's accumulated number of synchronizations (which is also locally stored by act 526 of the previous iteration). In the just-described act 514, if the current iteration is the first iteration, zero is used for both the previous iteration's accumulated numbers. Note that the accumulated number of synchronizations is not incremented by any process that finds the result is yes on its initial check in act 415 (see FIG. 4), or act 112, 122 (see FIG. 1) and returns to act 411 (FIG. 4) or act 111, 121 (see FIG. 1), because it does not perform the multi-phase wait 460 (FIG. 4) or the wait in operation 118, 128 (see FIG. 1).

Then, in act 515 (FIG. 5), process 318 computes a weighted moving average of sleep overhead, using current average sleep overhead (as computed in act 514, described above), and the average sleep overhead in the last S (e.g. 15) iterations (which are locally stored, by act 526 in the last S iterations). Thereafter, in acts 516 and 517, process 318 computes an upper bound and a lower bound on API sleep duration to be stored in memory location 254, as follows. In act 516, process 318 computes the maximum API sleep duration by subtracting the weighted moving average of sleep overhead (computed in act 515, as described above), from 2*average time to write to persistent memory. The average time to write to persistent memory is stored, e.g. at a location (not shown) in memory 1060, by process 317. In act 516, twice the average time to write to persistent memory is used to compute the maximum API sleep duration, in case database process 401 is required to wait for up to two iterations of persistence by process 317. For example, process 401 may perform acts 412 and 415 (FIG. 4) immediately after process 317 starts a first iteration of persistence, so the redo/undo data of process 401 cannot be persisted in the first iteration, and this requires process 401 to wait for completion of the first iteration and additionally wait for completion of a second iteration (in which the redo/undo data is persisted).

In act 517, process 318 computes the minimum API sleep duration by subtracting the weighted moving average of sleep overhead (computed in act 515, as described above), from the minimum time to write to persistent memory. The minimum time to write to persistent memory is also stored, e.g. at another location (not shown) in memory 1060.

Then, in act 518 (FIG. 5), process 318 computes a delta synchronization count, as the difference between the current iteration's accumulated number of synchronizations (e.g. in memory location 251) and the previous iteration's accumulated number of synchronizations (which, as noted above, is locally stored by act 526 of the previous iteration). Additionally, in act 519, process 318 computes a delta under-sleep count, as the difference between the current iteration's accumulated number of under-sleeps (e.g. in memory location 252) and the previous iteration's accumulated number of under-sleeps (which also is locally stored by act 526 of the previous iteration).

Thereafter, in act 520, process 318 computes a percentage of under-sleeps by dividing the delta under-sleep count (computed in act 519), by the delta synchronization count (computed in act 518), and multiplying by 100. Computation of a ratio between the delta under-sleep count and the delta synchronization count in act 520 (when computing the percentage) reduces inaccuracy, even if both these numbers become inaccurate, e.g. due to corresponding accumulated numbers (see acts 518 and 519) being incremented without locking by multiple processes (or threads). For example, if the delta under-sleep count and the delta synchronization count are 40,000 and 80,000 respectively, then their ratio is 0.5, while assume that on being accurately updated they would have been 50,000 and 90,000 respectively so the accurate ratio is 0.55. In this example, the two ratios 0.5 and 0.55 differ from one another by just 11%, and even this difference may have no effect when both ratios yield the same adjustment, depending on ranges that index into a table (e.g. described next).

After act 520, in act 521, process 318 uses the percentage computed in act 520 to determine an adjustment, by indexing via a range into a table e.g. as shown below. In some embodiments, the computed percentage of act 520 is compared to a predetermined percentage and an outcome of the comparison is used to identify a range, which in turn identifies a row in the table which holds a corresponding adjustment. Specifically, in the table below, ranges in the first column may be used in situations where the predetermined percentage is configured to be different from 50% (and called "Configured Target Default"), and ranges in the second column used when the predetermined percentage is 50%. In the table below, the percentage computed in act 520 is referred to as "U/S".

| Under-sleeps "U/S" relative to Configured Target Default ("CD") | % Under-sleeps "U/S" Relative to Actual Target Default (50%) | Adjustment to API Sleep Duration 254 (microseconds) |
|---|---|---|
| U/S > CD + 20 | U/S > 70 | +10 |
| CD + 20 >= U/S > CD + 15 | 70 >= U/S > 65 | +7 |
| CD + 15 >= U/S > CD + 10 | 65 >= U/S > 60 | +5 |
| CD + 10 >= U/S > CD + 5 | 60 >= U/S > 55 | +3 |
| CD + 5 >= U/S > CD + 2 | 55 >= U/S > 52 | +2 |
| CD + 2 >= U/S > CD + 1 | 52 >= U/S > 51 | +1 |
| U/S == CD | U/S == 50 | 0 |
| CD > U/S > (CD − 2) | 50 > U/S > 48 | −1 |
| (CD − 2) >= U/S > (CD − 5) | 48 >= U/S > 45 | −2 |
| (CD − 5) >= U/S > (CD − 10) | 45 >= U/S > 40 | −3 |
| (CD − 10) >= U/S > (CD − 15) | 40 >= U/S > 35 | −5 |
| (CD − 15) >= U/S > (CD − 20) | 35 >= U/S > 30 | −7 |
| (CD − 20) >= U/S | 30 >= U/S | −10 |

In the above table, the adjustment (see right-most column) increases, in a step-wise manner, with increase in difference between a percentage of under-sleeps ("U/S") computed in act 520 and a predetermined percentage (which is the configured target default, shown in the left-most column). For example, in the above table, the adjustment is 1 microsecond when the difference is in the range >1% and ≤2%, the adjustment is 2 microseconds when the difference is in the range >2% and ≤5%, and the adjustment is 3 microseconds when the difference is in the range >5% and ≤10%. The adjustments in the above table (see right-most column) are predetermined constants that are configured manually in some embodiments, before the startup of database management system 101, e.g. based on empirical data. As these are constants, the adjustments in the above table are unrelated to current values of any duration. Therefore, an adjustment is automatically identified in act 521 from among multiple constants in a table (see above), based on a percentage that is obtained by dividing an under-sleep count for a specific time period (e.g. between a current and previous iteration of a housekeeper process), by a synchronization count for that same time period.

Thereafter, in act 522 (FIG. 5), the adjustment determined in act 521 is applied by process 318 to API sleep duration 254 (FIG. 2) loaded from memory 1060, to obtain a raw sleep duration. Next, in act 523, process 318 constrains this raw sleep duration to a range between maximum API sleep duration and minimum API sleep duration (computed in acts 516 and 517, described above). Specifically, in act 523, process 318 sets the constrained sleep duration to be equal to the minimum API sleep duration, if the raw sleep duration is lower than the minimum API sleep duration. Similarly, process 318 sets the constrained sleep duration to be equal to the maximum API sleep duration, if the raw sleep duration is higher than the maximum API sleep duration. Finally, process 318 sets the constrained sleep duration to be equal to the raw sleep duration when the raw sleep duration is between (or equal to) the minimum API sleep duration and the maximum API sleep duration. Next, in act 524, process 318 uses the constrained sleep duration determined in act 523 with the API sleep durations recorded in the last S iterations (e.g. last 15 iterations), to compute a weighted moving average. Then, in act 525, process 318 stores this weighted moving average (which is now determined) as a new value of API sleep duration 254, in main memory 1060.

After act 525 (FIG. 5), process 318 goes to act 526 in which several values in the current iteration are stored locally, for use in one or more future iterations. Examples of values that may be stored in act 526 include: accumulated sleep overhead, accumulated number of synchronizations, accumulated number of under-sleeps, average sleep overhead, and API sleep duration. After act 525, process 318 goes to act 513 (described above). Note that the period of time (e.g. 3 seconds) for which act 513 is performed by process 318, is 5 to 6 orders of magnitude larger than API sleep duration 254, which may be only 50-100 microseconds in some embodiments.

Certain embodiments of process 318 are programmed to use the following formula for a moving average MA(old_avg, curr_value, new_avg, window_size), namely new_avg=old_avg+alpha*(curr_value−old_value)

Where:

alpha=2/(window_size+1)

The above formulae are combined into:

new_avg=old_avg+(curr_value−old_value)*2/(window_size+1)

A window size of 16 is used in such embodiments. Although a weighted moving average has just been described for certain embodiments of process 318, e.g. for use in acts 515, 524, other averages may be used in other embodiments. Thus, a specific average which is used in an illustrative implementation is not a critical aspect of some embodiments.

In certain embodiments, the loop limit used in act 433 (FIG. 4) is repeatedly computed by process 318 (e.g. every 3 seconds) to adjust the maximum time spent in the spin phase 440 to be such that at most X % (e.g. 2%) of under-sleepers (those executions of processes 311-316 that loop in acts 442-445), enter the exception handling phase 450. This X % target is set in some embodiments, to ensure that no more than X % of under-sleepers enter the spin phase 440 and not in trying to ensure that on average X % of under-sleepers enter the exception handling phase 450 (also called "backoff phase").

In some embodiments, the maximum spin time is repeatedly set to a factor*average spin time, where the factor is adjusted periodically by process 318. The average spin time is an average, across any executions of processes 311-316 that enter the loop of acts 432-435 (FIG. 4), of each execution's total time spent in this loop. Additionally, the just-described factor has a minimum value of, for example 2, which when applied to the average spin time yields a maximum spin time that may result only in a very small percentage of under-sleepers (e.g. much less than 2%), entering the exception handling phase 440. In certain embodiments, the maximum spin time is limited by an upper bound of 300 microseconds, which may result in more than 2% under-sleepers entering the exception handling phase 440. Use of such an upper bound acknowledges the fact that for short periods, it is possible that writes to persistent memory storage 1070 might result in outliers or errors. More specifically, use of an upper bound on the maximum spin time in some embodiments ensures that the average spin time does not continue to grow to accommodate such errors or outliers (which if it did, may result in CPU starvation).

In some embodiments, processes 311-316 maintain the following information. The accumulated number of under-sleeps (already described). The accumulated spin time in microseconds for all under-sleepers—initialized to 0 and incremented by the time spent any execution of each of processes 311-316 spends in the spin phase 440. In such embodiments, the following information is maintained by process 318 (also called "housekeeper" process). A moving average of spin time (which is the time spent in looping in acts 442-445) for under sleepers (using a window size of 16), initialized to 60 microseconds. A factor that was applied to the just-described moving average when process 318 executed most recently, and used in determining the maximum spin time. Maximum spin time=factor*moving average of the spin time. This factor has an initial value of 3 and a minimum value of 2.

In addition, process 318 (which may be executed, e.g. every three seconds) determines the following. The delta number of processes that entered the backoff phase since it last executed. The delta number of under-sleeps since it last executed. The delta total spin time since it last executed. The percentage of under-sleepers that entered the backoff phase since it last executed (because the spin time was too short) being the delta number of processes that entered the backoff phase/the delta number of under-sleeps*100. The average spin time in microseconds since it last executed (delta total spin time/delta number of under-sleeps). If process 318 finds that the percentage of under-sleepers that entered the backoff phase is greater than 2%, then process 318 increases the factor that is applied to the average spin time, by 1. And, if process 318 finds that the (increased) factor*average spin time is greater than 300 microseconds, then process 318 set the maximum spin time to 300 microseconds and leaves the factor with the same value it had prior to its being incremented. If process 318 finds that the percentage of under-sleepers that entered the backoff phase is less than 2% then process 318 decreases the factor that is applied to the average spin time, by 1, subject to a minimum value of 2.

In some embodiments, computer 100 includes a database 1002 (FIGS. 6, 7A), which includes, e.g. a control file and multiple data file(s) stored on one or more disks 1012A-1012C (together referred to as disks 1012) and containing information related to data of rows in tables accessible via a relational database management system (RDBMS). Disks 1012A-1012C may be, for example, magnetic disks in some embodiments. Other embodiments may store one or more (or all) files of database 1002 in one or more devices that contain other types of non-volatile storage media, such as a solid state drive (SSD) that contains flash memory (e.g. implemented by memory chips that contain NAND gates and/or NOR gates). One or more processes of the RDBMS in computer (also called "server computer") 100, such as processes 311-316 (FIG. 3) may retrieve data from database 1002 by supplying thereto, for example, an identifier of a table in a request 1006A (FIG. 6), and receive therefrom a response 1006B which includes rows of values in the just-described table. The retrieved row values may be stored by processes 311-316 in memory 1060 (FIGS. 6, 7A) of server computer 100. As noted above, memory 1060 of some embodiments is accessible by remote DMA to other computers (also called "client computers"), such as computer 610.

A process 181 in client computer 610 may execute client software that automatically issues, e.g. a query 1004 (FIG. 6) in a structured query language (SQL). The just-described SQL query 1004 may be transmitted from process 181 in client computer 610 to one of processes 311-316 in server computer 100, in a network I/O command via remote DMA. Processes 311-316 may transfer results of query execution as data 1005 (also via remote DMA) as responsive to the network I/O command. In addition to responding to queries from client computer 610, server computer 100 may automatically respond to similar SQL queries from other client computers, such as client devices 1010, wherein all these computers may be coupled to each other by communication switch 175, which may be implemented, e.g. as an Ethernet switch.

To support remote DMA from computer 610 (FIG. 6), a portion of memory 1060 within server computer 100 is made accessible to client computer 610, and client computer 610 writes SQL query 1004 (FIG. 6) into memory 1060 by use of an embedded processor (not shown) in network interface module 1050 without involving any processors 1041-1044 in server computer 100. Similarly, to support remote DMA from server computer 100, a portion of memory 180 within client computer 610 is made accessible to server computer 100, and server computer 100 writes into memory 180 by use of an embedded processor (not shown) in network interface module 150 without involving any processors 1141-1144 (FIG. 6) in computer 610. Computers 610 and 100 are coupled to one another via a communications switch 175 which implements a network (such as Ethernet).

In some embodiments, server computer 100 (FIG. 6) may execute processes 311-316 (FIG. 3) to automatically transfer one or more data blocks from memory 1060 via remote DMA to memory 180 of client computer 610. Specifically, server computer 100 (FIG. 6, 7A) may be configured to execute one or more processes (which may be portions of any application or portions of an operating system) that wait for completion of a write to persistent memory storage, in multiple phases, including at least a sleep phase (by making a sleep( ) call specifying an API sleep duration that is dynamically determined) and if further waiting is needed after awakening, a spin phase by automatically performing continuous polling.

In some embodiments of computers 610, 100, functionality in one or more steps or acts described above in reference to FIGS. 1-5 may be performed by any of processors 1141-1144 (FIG. 6) and processors 1041-1044 (FIG. 6) executing software in memories 180, 1060 respectively, although in other embodiments such functionality is implemented in any combination of hardware circuitry and/or firmware and/or software in computers 610, 100. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing one or more steps or acts described above in reference to FIGS. 1-5 can, but need not necessarily include, one or more microprocessors, embedded processors, controllers, application specific integrated circuits (ASICs), digital signal processors (DSPs), multi-core processors and the like.

Figure 6:
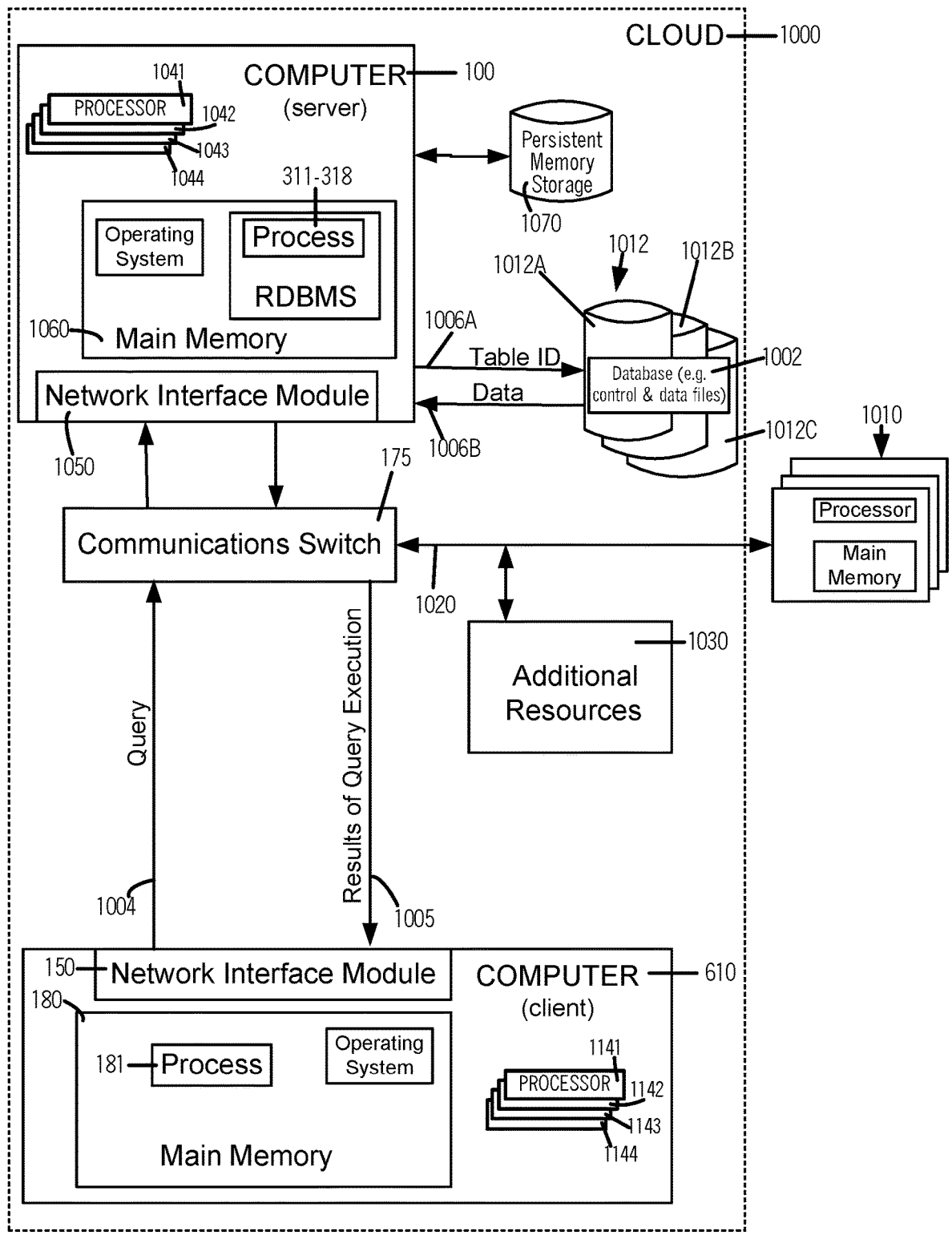
FIG. 6 illustrates, in data flow block diagram, a server computer 100 and a client computer 610 either or both of which may implement one or more blocks and/or perform one or more acts of the type illustrated in FIGS. 1-5.

Any non-transitory computer readable medium tangibly embodying software (also called "computer instructions") may be used in implementing one or more acts or steps described above in reference to FIGS. 1-5. Such software may include program codes stored in memory 180, 1060 and executed by processors 1141-1144, and processors 1041-1044 (FIG. 6). Memory 180, 1060 may be implemented within or external to processors 1141-1144, and processors 1041-1041, depending on the embodiment. When implemented in firmware and/or software, logic to perform one or more acts or steps described above in reference to FIGS. 1-5 may be stored as one or more computer instructions or code on a non-transitory computer-readable medium.

In some embodiments, computers 610, 100 may include multiple processors 1141-1144 and processors 1041-1044 (FIG. 6), each of which is programmed with software in memory 180, 1060 shared with each other to perform acts or steps of the type described above. For example, a first processor 1041 (FIG. 6) in computer 100 may be programmed with software in memory 1060 to implement act 111 to generate and store redo/undo data into a log buffer in main memory, as described above in reference to FIG. 1. In this example, a second processor 1042 (FIG. 6) in computer 100 may be programmed with software in memory 1060 to implement act 112, to check whether redo/undo data is written to persistent memory storage, as described above in reference to FIG. 1. In this example, the second processor 1042 (FIG. 6) is further programmed with software in memory 1060 to implement act 113 to sleep by specifying a sleep duration that is automatically determined based on previous results of checks after awakening, as described above in reference to FIG. 1. Also in this example, a third processor 1043 (FIG. 6) in computer 100 may be programmed with software in memory 1060 to implement any remaining portion of act 113 after awakening, followed by acts 114 and 117, as described above in reference to FIG. 1. In some embodiments, one or more processor(s) 1041-1044 are used in a time-shared manner, to execute all processes in computer 100, and one of processors 1041-1044 may be allocated to execute a process (such as process 110) for a specific period of time (also called "time slice"), regardless of which acts are performed during the time slice. Furthermore, although processors 1041-1044 have been described above for certain embodiments as being included in a single computer 100, in other embodiments multiple such processors 1041-1044 may be included in multiple computers 100, for example two computers may implement two steps of a process, as described herein.

In some embodiments, when additional waiting is needed after a sleep phase 420 (see FIG. 4), process 401 implements repeated checking without processor relinquishment (e.g. in spin phase 440 in FIG. 4) for no more than a specified time period (or in alternative embodiments, a specified number of iterations) that is automatically determined (e.g. by a modified version of process 318 that implements adaptive spinning) to reduce processing load in a majority of situations (e.g. more than 50%), based on durations of recent writes to persistent memory storage (e.g. maintained by a modified version of process 317 to support adaptive spinning). In spin phase 440, process 401 (FIG. 4) implements a loop (e.g. by performing acts 442-445 in FIG. 4) to repeatedly check on persistence of its redo/undo data, until a loop limit is reached (e.g. by passage of the specified time period, or performance of the specified number of iterations).

While looping (e.g. in spin phase 440), when a loop limit is reached without completion of persistence, process 401 (FIG. 4) automatically goes into exception handling phase 450. In a majority of situations (e.g. more than 50%), persistence of redo/undo data may be completed before the loop limit is reached, and hence process 401 automatically exits spin phase 440 via the yes branch of act 442, which avoids any latency that may be incurred if a sleep( ) system call were made to the operating system. In some embodiments, the just-described completion of redo/undo data persistence before reaching the loop limit, occurs in most of the situations (e.g. in more than 99% of redo/undo data persistences). While continuous polling for persistence of redo/undo data in spin phase 440, process 401 consumes CPU cycles and therefore starves other processes and/or threads from doing productive work (due to their lack of CPU cycles).

Spinning for no more than a loop limit which is automatically determined and specified (e.g. by process 318), specifically for current execution of spin phase 440 by one or more of processes 311-316 implements a spin phase that dynamically adapts itself to latencies to minimize CPU resource consumption. Thus, in several embodiments, the loop limit of spin phase 440 in a multi-phase wait (which includes an earlier sleep phase) is not constant, and may be changed automatically even while polling for completion of persistence of redo/undo data, i.e. the loop limit does not have a fixed value. Thus in some embodiments, a limiting condition based on such a loop limit is not static across multiple waits for persistence of redo/undo data, and instead changes dynamically.

Depending on the embodiment, either or both of computers 610 and 100, which perform one or more acts or steps described above in reference to FIGS. 1-5, may be implemented in a system 1000, described below as a "cloud". Cloud 1000 (FIG. 6) of some embodiments includes a pool of resources including, for example, a relational database management system (RDBMS) executing in one or more processors 1041-1044 of server computer 100. Examples of additional resources 1030 which may be included in the pool are processor, server, data storage, virtual machine (VM), platform, and/or other software applications. The pool of resources in cloud 1000 may be geographically centralized and/or distributed. As an example, the pool of resources in cloud 1000 may be located at one or more datacenters.

Client devices 1010 (FIG. 6) outside cloud 1000 may independently request resources in the form of computing services, such as CPU time (e.g. in processors 1141-1144 in computer 610) and storage (e.g. in disks 1012A-1012C on which files of database 1002 may be stored in server computer 100), as needed. The just-described resources 1141-1144, 1012 and additional resources 1030 may be dynamically assigned by server computer 100 to the requests and/or client devices 1010 on an on-demand basis. One or more resources 1141-1144, 1012, 1030 which are assigned to each particular client device 1010 may be scaled up or down based on the services requested by the particular client device. The resources 1141-1144, 1012, 1030 assigned to each particular client device 1010 may also be scaled up or down based on the aggregated demand for computing services requested by all client devices 1010.

In an embodiment, the resources 1141-1144, 1012, 1030 included in cloud 1000 (FIG. 6) are accessible via switch 175 over a network 1020, such as a private network or the Internet. One or more physical and/or virtual client devices 1010 demanding use of the resources 1141-1144, 1012, 1030 may be local to or remote from cloud 1000. The client devices 1010 may be any type of computing devices, such as computers or smartphones, executing any type of operating system. The client devices 1010 communicate requests to access the resources 1141-1144, 1012, 1030 in cloud 1000 using a communications protocol, such as Hypertext Transfer Protocol (HTTP). Such requests, which are communicated by client devices 1010 via network 1020 to the resources 1141-1144, 1012, 1030, may be expressed in conformance with an interface, such as a client interface (e.g. a web browser), a program interface, or an application programming interface (API).

In some embodiments, a cloud service provider provides access to cloud 1000 (FIG. 6) to one or more client devices 1010. Various service models may be implemented by cloud 1000 including but not limited to Software-as-a-Service (SaaS), Platform-as-a-Service (PaaS), and Infrastructure-as-a-Service (IaaS). In SaaS, a cloud service provider provides client devices 1010 the capability to use the cloud service provider's applications, which are executing on the resources in cloud 1000. Thus, processing, storage, networks, and other resources 1141-1144, 1012, 1030 of server computer 100 may be made available to client devices 1010, in the form of SaaS. In PaaS, the cloud service provider provides cloud users the capability to deploy onto cloud resources 1141-1144, 1012, 1030 custom applications, which are created using programming languages, libraries, services, and tools supported by the cloud service provider. In PaaS, the cloud service provider may make available to client devices 1010, one or more applications in server computer 100 (described above), such as a Relational Database Management System (RDBMS) as a service, Customer Relationship Management (CRM) application as a service, Enterprise Resource Planning (ERP) as a service, and Java as a service.

In IaaS, the cloud service provider provides cloud users the capability to provision processing, storage, networks, and other resources 1141-1144, 1012, 1030 in the cloud 1000. Any applications and/or operating systems, in server computer 100 (described above) may be deployed on the resources 1141-1144, 1012, 1030. Resources 1141-1144, 1012, 1030 may be used to implement processes to perform one or more acts or steps or operations described above in reference to FIGS. 1-5, such as processes 311-318 (FIG. 3).

In some embodiment, various deployment models may be implemented by cloud 1000, including but not limited to a private cloud, a public cloud, and a hybrid cloud. In a private cloud, cloud resources 1141-1144, 1012, 1030 (FIG. 6) are provisioned for exclusive use by a particular group of one or more users, referred to below as entities, examples of which are a corporation, an organization, a single person, a family, or other such groups of users. The cloud resources may be located on the premises of one or more entities in the particular group, and/or at one or more remote off-premise locations. In a public cloud, cloud resources are provisioned for use by multiple entities (also referred to herein as "tenants" or "customers"). Each tenant uses one or more client devices 1010 to access cloud resources 1141-1144, 1012, 1030. Several tenants may share their use of a particular resource, such as server computer 100 in cloud 1000 at different times and/or at the same time. Cloud resources 1141-1144, 1012, 1030 may be located at one or more remote off-premise locations, away from the premises of the tenants.

In some embodiments referred to as hybrid cloud, cloud 1000 (FIG. 6) includes a private cloud (not shown) and a public cloud (not shown). A cloud interface (not shown) between the private cloud and the public cloud allows for data and application portability. Data stored at the private cloud and data stored at the public cloud may be exchanged through the cloud interface. Applications implemented at the private cloud and applications implemented at the public cloud may have dependencies on each other. A call from an application at the private cloud to an application at the public cloud (and vice versa) may be executed through the cloud interface.

In certain embodiments, cloud 1000 (FIG. 6) is configured to support multiple tenants such that each tenant is independent from other tenants. For example, a business or operation of one tenant may be separate from a business or operation of another tenant. Each tenant may require different levels of computing services to be provided by the cloud computing network. Tenant requirements may include, for example, processing speed, amount of data storage, level of security, and/or level of resiliency.

In various embodiments, tenant isolation is implemented in cloud 1000 (FIG. 6). Each tenant corresponds to a unique tenant identifiers (IDs). Data sets and/or applications implemented on cloud resources that are associated with a particular tenant are tagged with the tenant ID of the particular tenant. Before access to a particular data set or application is permitted, the tenant ID is verified to determine whether the corresponding tenant has authorization to access the particular data set or application.

In several embodiments of cloud 1000 (FIG. 6), data sets corresponding to various tenants are stored as entries in a database 1002. Each entry is tagged with the tenant ID of the corresponding tenant. A request for access to a particular data set is tagged with the tenant ID of the tenant making the request. The tenant ID associated with the request is checked against the tenant ID associated with the database entry of the data set to be accessed. If the tenant IDs are the same, then access to the database entry is permitted.

In a few embodiment of cloud 1000 (FIG. 6), data sets and virtual resources (e.g., virtual machines, application instances, and threads) corresponding to different tenants are isolated to tenant-specific overlay networks, which are maintained by cloud 1000. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint de-capsulates the outer packet to obtain the original packet transmitted by the source device. The original packet is transmitted from the second encapsulation tunnel endpoint to the destination device in the same particular overlay network.

Figure 7A:
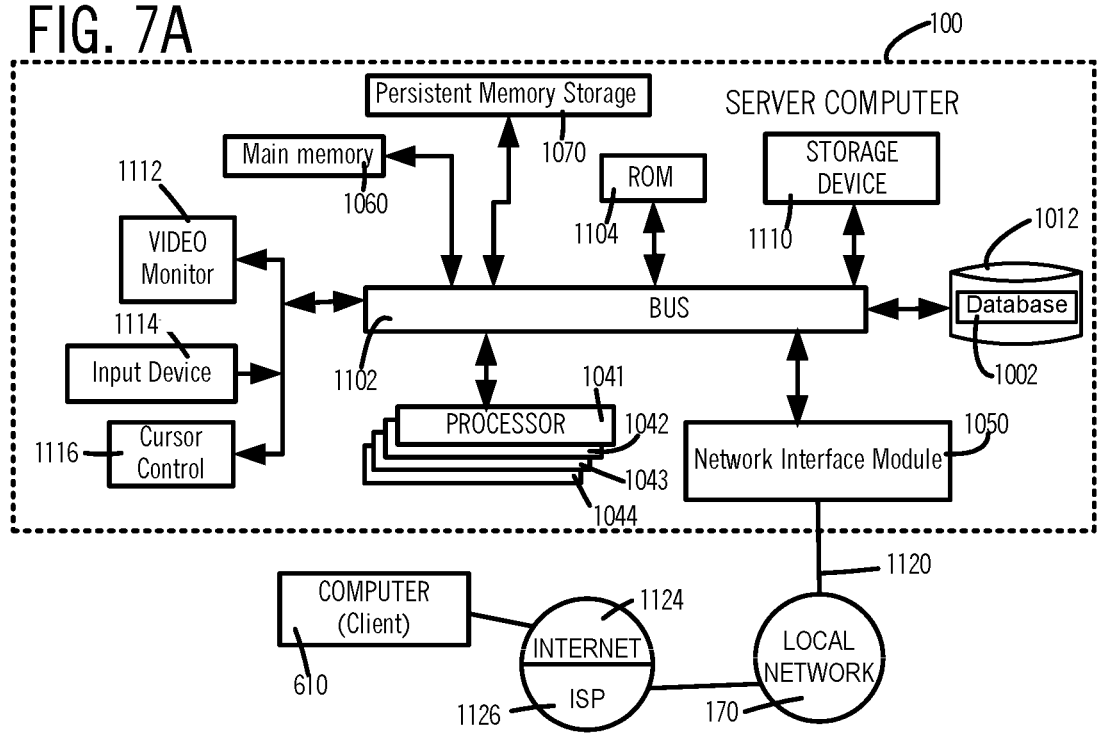
FIGS. 7A and 7B illustrate, in high-level block diagrams, hardware used to respectively implement server 100 and client 110 of FIGS. 1-6, in some illustrative embodiments.
Figure 7B:
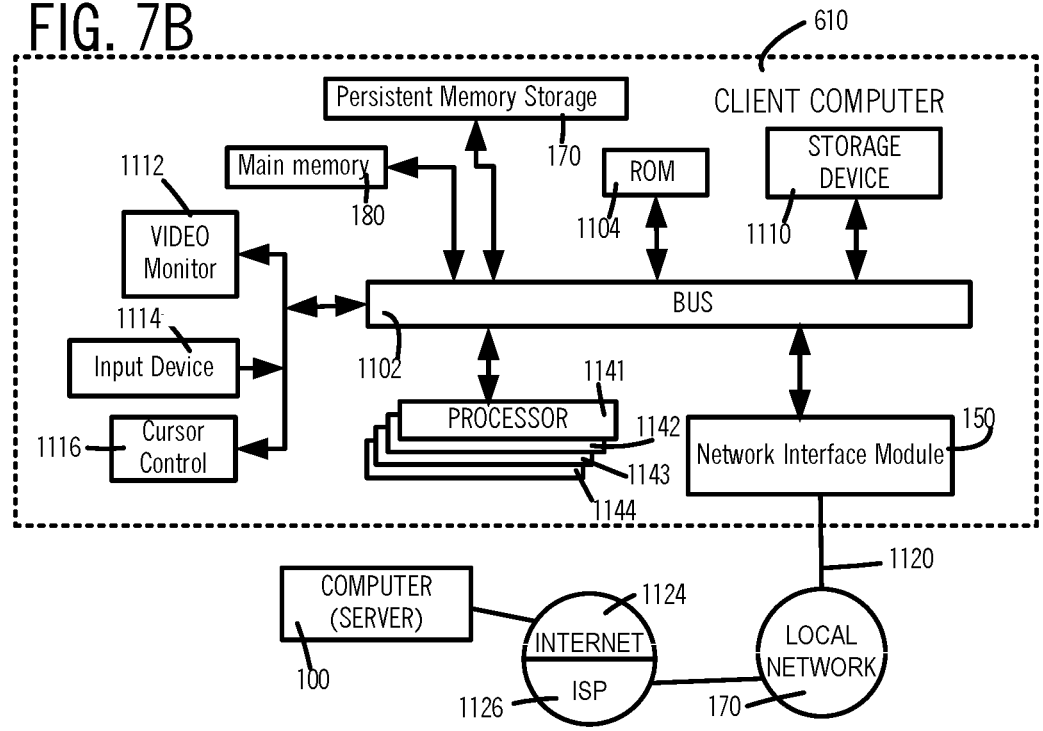

One or more of steps and acts described above in reference to FIGS. 1-5 may be used to program one or more computer(s) 610, 100 each of which may be implemented in hardware of the type illustrated in FIGS. 7B and 7A. Each of computers 610, 100 include a bus 1102 (FIGS. 7A, 7B) or other communication mechanism for communicating information. Computer 610 may include processors 1141-1144 (FIG. 7B), and computer 100 may include processors 1041-1044 (FIG. 7A). Bus 1102 (FIGS. 7A, 7B) connects processors 1041-1044, and processors 1141-1144 respectively to main memory 1060 and main memory 180. Main memory 1060, 180 may be implemented, for example, as random access memory (RAM) or other dynamic storage device, coupled to bus 1102 for storing information and instructions (e.g. to perform the steps and acts described above in reference to FIGS. 1-5) to be executed by processors 1041-1044, and processors 1141-1144 respectively. Memory 1060, 180 (FIGS. 7A, 7B) may be used additionally for storing temporary variables or other intermediate information during execution of instructions to be executed by processors 1041-1044, and processors 1141-1144.

Computers 100, 610 (FIG. 7A, 7B) may include read only memory (ROM) 1104 or other static storage device coupled to bus 1102 for storing static information and instructions for processors 1041-1044, and processors 1141-1144 respectively, such as software in the form of relational database management system (RDBMS) software. A storage device 1110, such as a magnetic disk or optical disk may be included in computers 100, 610 and coupled to bus 1102 for storing information and instructions.

Computers 100, 610 (FIG. 7A, 7B) may include a display device or video monitor 1112 such as a cathode ray tube (CRT) or a liquid crystal display (LCD) which is coupled to bus 1102 for use in displaying information to a computer user. Computers 100, 610 may include an input device 1114, including alphanumeric and other keys (e.g. of a keyboard) also coupled to bus 1102 for communicating information (such as user input) to processors 1041-1044, and processors 1141-1144. Another type of user input device is cursor control 1116, such as a mouse, a trackball, or cursor direction keys for communicating information and command selections to processors 1041-1044, and processors 1141-1144 and for controlling cursor movement on display device 1112. This input device typically has two degrees of freedom in two axes, a first axis (e.g., x) and a second axis (e.g., y), that allows the input device to specify positions in a plane.

As described above, an API sleep duration which is specified for processor relinquishment when calling a sleep ( ) function may be tuned, for each wait by processors 1041-1044 executing one or more sequences of one or more instructions that are contained in memory 1060 and memory 180 respectively. Such instructions may be read into memory 1060, 180 from another non-transitory computer-readable storage medium, such as storage device 1110. Execution of the sequences of instructions contained in main memory 1060, 180 causes respective processors 1041-1044, and processors 1141-1144 to perform the steps, acts, operations of one or more of processes 311-318 (FIGS. 3, 4 and 5). In alternative embodiments, hard-wired circuitry may be used in place of or in combination with software instructions.

The term "non-transitory computer-readable storage medium" as used herein refers to any non-transitory storage medium that participates in providing instructions to processors 1041-1044, and processors 1141-1144 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computers 100, 610. Volatile storage media includes dynamic memory, such as memory 1060, 180 which may be implemented in the form of a random access memory or RAM.

Instructions to processors 1041-1044 and processors 1141-1144 can be provided by a transmission link or by a non-transitory storage medium from which a computer can read information, such as data and/or code. Specifically, various forms of transmission link and/or non-transitory storage medium may be involved in providing one or more sequences of one or more instructions to processors 1041-1044 and processors 1141-1144 for execution. For example, the instructions may initially be comprised in a non-transitory storage device, such as a magnetic disk, of a computer. Such a computer can load the instructions into its dynamic memory (RAM) and send the instructions over a telephone line using a modem.

A modem local to computers 100, 610 can receive information on the telephone line and use an infra-red transmitter to transmit the information in an infra-red signal. An infra-red detector can receive the information carried in the infra-red signal and appropriate circuitry can place the information on bus 1102. Bus 1102 carries the information to memory 1060, 180, from which processors 1041-1044 and processors 1141-1144 retrieve and execute the instructions. The instructions received by memory 1060, 180 may optionally be stored on storage device 1110 either before or after execution by processors 1041-1044 and processors 1141-1144.

Computers 100, 610 include respective network interface modules 1050, 150 coupled to bus 1102. Network interface modules 1050, 150 provide two-way data communication coupling to network link 1120 that is connected to a network 170. Network 170 may interconnect multiple computers (as described above). For example, network interface module 1050, 150 may be an integrated services digital network (ISDN) card or a modem to provide a data communication connection to a corresponding type of telephone line. As another example, network interface module 1050, 150 may be a local area network (LAN) card to provide a data communication connection to a compatible LAN. Wireless links may also be implemented. In any such implementation, network interface module 1050, 150 sends and receives electrical, electromagnetic or optical signals that carry digital data streams representing various types of information.

Network link 1120 typically provides data communication through one or more networks to other data devices. For example, network link 1120 may provide a connection through network 170 to data equipment operated by an Internet Service Provider (ISP) 1126. ISP 1126 in turn provides data communication services through the world wide packet data communication network 1124 now commonly referred to as the "Internet". Network 170 and network 1124 both use electrical, electromagnetic or optical signals that carry digital data streams. The signals through the various networks and the signals on network link 1120 and through network interface module 1050, 150, which carry the digital data to and from computers 100, 610, are exemplary forms of carrier waves transporting the information.

Computers 100, 610 can send messages and receive data, including program code, through the network(s), network link 1120 and network interface module 1050, 150. In the Internet example, a server computer 100 might transmit information retrieved from RDBMS database through Internet 1124, ISP 1126, network 170 and network interface module 1050, 150. Computer instructions for performing one or more steps or acts described above in reference to FIGS. 1-7 may be executed by processors 1041-1044 and processors 1141-1144 as they are received, and/or stored in storage device 1110, or other devices that contain non-volatile storage media for later execution. In this manner, computers 100, 110 may additionally or alternatively obtain instructions and any related data in the form of a carrier wave.

Note that FIGS. 7A and 7B are low-level representations of some hardware components of computers 100, 110. Several embodiments have additional software components and/or related data in memory 1060, 180. In addition to memory 180, 1060, computers 110, 100 may include one or more other types of memory such as flash memory (or SD card) and/or a hard disk and/or an optical disk (also called "secondary memory") to store data and/or software for loading into memory 180, 1060 (also called "main memory") and/or for use by processors 1041-1044 and processors 1141-1144. In some embodiments, server computer 100 implements a relational database management system to manage data in one or more tables of a relational database 1002 of the type illustrated in FIGS. 6, 7A. Such a relational database management system may manage a distributed database that includes multiple databases, and tables may be stored on different storage mechanisms.

In some embodiments, processors 1041-1044 that execute software of a relational database management system can access and modify the data in a relational database 1002, and hence server computer 100 accepts queries in conformance with a relational database language, the most common of which is the Structured Query Language (SQL). The commands are used by processors 1041-1044 of some embodiments to store, modify and retrieve data about an application program in the form of rows in a table in relational database 1002. Client computer 610 may include output logic that makes the data in a database table retrieved from database 1002 via server computer 100, available to a user via a graphical user interface that generates a screen of an application program on a video monitor 1112. In one example, the output logic of client computer 610 provides results on a monitor or other such visual display, via a command line interface. Additionally and/or alternatively, screens responsive to a command in a command-line interface and display on a video monitor may be generated by server computer 100.

In certain embodiments, computer 100 may be programmed to perform, in addition to one or more acts described above in reference to FIGS. 1-5, any prior art step, act or operation of the type described in, for example, U.S. Pat. No. 9,418,129 entitled "Adaptive High-Performance Database Redo Log Synchronization" by Chi Cao Minh, Vinay H. Srihari, Yunrui Li and Jonghyun Lee, filed on Mar. 8, 2013 and issued on Aug. 16, 2016, which is incorporated by reference herein in its entirety.

Numerous modifications and adaptations of the embodiments described herein will become apparent to the skilled artisan in view of this disclosure. Numerous modifications and adaptations of the embodiments described herein are encompassed by the attached claims.

The invention claimed is:

1. A method of implementing processes or threads or processes and threads in a computer that includes main memory and persistent memory and one or more processors coupled to the main memory and to the persistent memory, the method comprising:

specifying a current value of sleep duration;

generating and storing log records of a database into a log buffer in the main memory by multiple processes or threads or processes and threads executing in the one or more processors, wherein the database issues an instruction to write the log records from a first type of computer memory to a second type of computer memory, the first type corresponds to a volatile memory embodied as the main memory, and the second type corresponds to a nonvolatile memory embodied as a persistent memory;

waiting, by at least one process or thread, for respective log records to be written to the persistent memory by a different process, wherein
the waiting comprises a sleep phase and a spin phase after the sleep phase;
in the sleep phase, at least sleeping by the current value of sleep duration;
after awakening from the sleeping, checking if the respective log records have been written to the persistent memory; and
in response to finding, by the checking after awakening, that the respective log records have not been written to the persistent memory,
executing the spin phase by repeatedly performing at least the checking, wherein the current value of sleep duration is determined automatically, based at least partially on previous results of performing the checking after awakening; and
updating the current value of the sleep duration with a new value of the sleep duration based at least in part a result of repeatedly checking whether the respective log records have been persisted.

2. The method of claim 1 further comprising:
after awakening from the sleeping, each process or thread incrementing a first accumulated number in a first location in the main memory when a previous result of the checking is that the respective log records have not been written to the persistent memory, wherein the first accumulated number is not incremented by said each process or thread when the previous result is that the respective log records have been written to the persistent memory;
said each process or thread additionally incrementing a second accumulated number in a second location in the main memory, each time said sleeping is performed; and
comparing the first accumulated number with the second accumulated number and using an outcome thereof to automatically determine the current value of sleep duration, wherein each of the first accumulated number and the second accumulated number is updated without the multiple processes or threads or processes and threads locking out one another.

3. The method of claim 2 wherein comparing the first accumulated number with the second accumulated number comprises dividing the first accumulated number by the second accumulated number, and using the outcome comprises:
applying to a previous value of sleep duration, an adjustment that is identified automatically from among a plurality of constants based at least in part on a result obtained by dividing the first accumulated number by the second accumulated number.

4. The method of claim 3 wherein:
the adjustment increases in a step-wise manner with an increase in a difference between the result obtained by dividing the first accumulated number by the second accumulated number and a configured target default.

5. The method of claim 1, further comprising:
determining whether the result of repeated checking whether the respective log records exceeds a threshold; and in response to a determination that the result of repeated checking whether the respective log records exceeds the threshold, the at least one process or thread re-entering the sleep phase for the sleep duration with the new value.

6. The method of claim 1, further comprising:
comparing the result of repeatedly checking whether the respective log records have been persisted to a threshold, wherein the result comprises an accumulated negative result of checking from a plurality of repeated checks indicating that the respective log records have not been persisted in the persistent memory; and
when it is determined that the result exceeds the threshold, the at least one process or thread entering the sleep phase for a duration corresponding to the new value of the sleep duration.

7. The method of claim 1 further comprising:
each process or thread performing before waiting for the respective log records to be written to the persistent memory, an initial check if the respective log records have been written to the persistent memory, wherein
waiting for the respective log records to be written to the persistent memory is performed by the each process or thread in response to finding by the initial check that the respective log records have not been written to the persistent memory; and
an additional process or thread storing additional log records, wherein
waiting for the respective log records to be written to the persistent memory is performed by the different process but not performed by the additional process or thread, based at least in part on finding by performing a separate initial check on whether the additional log records have been written to the persistent memory.

8. The method of claim 1 wherein:
the respective log records comprise a plurality of sequences, each sequence comprising a plurality of log records that are ordered relative to one another;
one or more log records of the plurality of log records in each sequence comprise one or more descriptions of one or more changes to execute a transaction on the database that is accessible through a relational database management system (RDBMS); and
after completion of the writing of the respective log records to the persistent memory, the at least one process or thread notifying a client of the database that the transaction is committed.

9. One or more non-transitory computer-readable storage media holding a plurality of instructions that, when executed by one or more processors in a computer, causes:
specifying a current value of sleep duration;
generating and storing log records of a database into a log buffer in the main memory by multiple processes or threads or processes and threads executing in the one or more processors, wherein the database issues an instruction to write the log records from a first type of computer memory to a second type of computer memory, the first type corresponds to a volatile memory embodied as the main memory, and the second type corresponds to a nonvolatile memory embodied as a persistent memory;
waiting, by at least one process or thread, for respective log records to be written to the persistent memory by a different process, wherein
the waiting comprises a sleep phase and a spin phase after the sleep phase;

in the sleep phase, at least sleeping by the current value of sleep duration;

after awakening from the sleeping, checking if the respective log records have been written to the persistent memory; and in response to finding, by the checking after awakening, that the respective log records have not been written to the persistent memory, executing the spin phase by repeatedly performing at least the checking, wherein the current value of sleep duration is determined automatically, based at least partially on previous results of performing the checking after awakening; and updating the current value of the sleep duration with a new value of the sleep duration based at least in part a result of repeatedly checking whether the respective log records have been persisted.

10. The one or more non-transitory computer-readable storage media of claim 9 wherein the plurality of instructions when executed by the one or more processors further cause:

after awakening from the sleeping, each process or thread incrementing a first accumulated number in a first location in the main memory when a previous result of the checking is that the respective log records have not been written to the persistent memory, wherein
the first accumulated number is not incremented by said each process or thread when the previous result is that the respective log records have been written to the persistent memory;

said each process or thread additionally incrementing a second accumulated number in a second location in the main memory, each time said sleeping is performed; and comparing the first accumulated number with the second accumulated number and using an outcome thereof to automatically determine the current value of sleep duration, wherein each of the first accumulated number and the second accumulated number is updated without the multiple processes or threads or processes and threads locking out one another.

11. The one or more non-transitory computer-readable storage media of claim 10 wherein comparing the first accumulated number with the second accumulated number comprises dividing the first accumulated number by the second accumulated number, and using the outcome comprises:

applying to a previous value of sleep duration, an adjustment that is identified automatically from among a plurality of constants based at least in part on a result obtained by dividing the first accumulated number by the second accumulated number.

12. The one or more non-transitory computer-readable storage media of claim 11 wherein:

the adjustment increases in a step-wise manner with an increase in a difference between the result obtained by the dividing the first accumulated number by the second accumulated number and a configured target default.

13. The one or more non-transitory computer-readable storage media of claim 9, wherein the plurality of instructions when executed by the one or more processors further causes:

determining whether the result of repeated checking whether the respective log records exceeds a threshold; and in response to a determination that the result of repeated checking whether the respective log records exceeds the threshold, the at least one process or thread re-entering the sleep phase for the sleep duration with the new value.

14. The one or more non-transitory computer-readable storage media of claim 9, wherein the plurality of instructions, when executed, further causes:

comparing the result of repeatedly checking whether the respective log records have been persisted to a threshold, wherein the result comprises an accumulated negative result of checking from a plurality of repeated checks indicating that the respective log records have not been persisted in the persistent memory; and when it is determined that the result exceeds the threshold, the at least one process or thread entering the sleep phase for a duration corresponding to the new value of the sleep duration.

15. The one or more non-transitory computer-readable storage media of claim 9 wherein the plurality of instructions when executed by the one or more processors further cause:

each process or thread performing before waiting for the respective log records to be written to the persistent memory, an initial check if the respective log records have been written to the persistent memory, wherein
waiting for the respective log records to be written to the persistent memory is performed by the each process or thread in response to finding by the initial check that the respective log records have not been written to the persistent memory; and an additional process or thread storing additional log records, wherein
waiting for the respective log records to be written to the persistent memory is performed by the different process but not performed by the additional process or thread, based at least in part on finding by performing a separate initial check on whether the additional log records have been written to the persistent memory.

16. The one or more non-transitory computer-readable storage media of claim 9 wherein:

the respective log records comprise a plurality of sequences, each sequence comprising a plurality of records that are ordered relative to one another;

one or more log records of the plurality of log records in each sequence comprise one or more descriptions of one or more changes to execute a transaction on the database that is accessible through a relational database management system (RDBMS); and after completion of the writing of the respective log records to the persistent memory, the at least one process or thread notifying a client of the database that the transaction is committed.

17. An apparatus comprising a memory coupled to one or more processors in a computer, the one or more processors being configured to execute instructions to cause:

specifying a current value of sleep duration;

generating and storing log records of a database into a log buffer in the main memory by multiple processes or threads or processes and threads executing in the one or more processors, wherein the database issues an instruction to write the log records from a first type of computer memory to a second type of computer memory, the first type corresponds to a volatile memory embodied as the main memory, and the second type corresponds to a nonvolatile memory embodied as a persistent memory;

waiting, by at least one process or thread, for respective log records to be written to the persistent memory by a different process, wherein
the waiting comprises a sleep phase and a spin phase after the sleep phase;

in the sleep phase, at least sleeping by the current value of sleep duration;

after awakening from the sleeping, checking if the respective log records have been written to the persistent memory; and in response to finding, by the checking after awakening, that the respective log records have not been written to the persistent memory,
executing the spin phase by repeatedly performing at least the checking, wherein the current value of sleep duration is determined automatically, based at least partially on previous results of performing the checking after awakening; and
updating the current value of the sleep duration with a new value of the sleep duration based at least in part a result of repeatedly checking whether the respective log records have been persisted.

18. The apparatus of claim 17 wherein the one or more processors are configured to execute instructions to further cause:
after awakening from the sleeping, each process or thread incrementing a first accumulated number in a first location in the main memory when a previous result of the checking is that the respective log records have not been written to the persistent memory, wherein the first accumulated number is not incremented by said each process or thread when the previous result is that the respective log records have been written to the persistent memory;
said each process or thread additionally incrementing a second accumulated number in a second location in the main memory, each time said sleeping is performed; and
comparing the first accumulated number with the second accumulated number and using an outcome thereof to automatically determine the current value of sleep duration.

19. The apparatus of claim 18, wherein comparing the first accumulated number with the second accumulated number comprises dividing the first accumulated number by the second accumulated number, and using the outcome comprises:
applying to a previous value of sleep duration, an adjustment that is identified automatically from among a plurality of constants based at least in part on a result obtained by dividing the first accumulated number by the second accumulated number.

20. The apparatus of claim 17, wherein the one or more processors being configured to execute instructions to further cause:
determining whether the result of repeated checking whether the respective log records exceeds a threshold; and
in response to a determination that the result of repeated checking whether the respective log records exceeds the threshold, the at least one process or thread re-entering the sleep phase for the sleep duration with the new value.

\* \* \* \* \*

UNITED STATES PATENT AND TRADEMARK OFFICE
CERTIFICATE OF CORRECTION

PATENT NO. : 11,720,416 B2
APPLICATION NO. : 16/570895
DATED : August 8, 2023
INVENTOR(S) : Ivey et al.

It is certified that error appears in the above-identified patent and that said Letters Patent is hereby corrected as shown below:

In the Drawings

On sheet 2 of 7, in FIG. 2, under Reference Numeral 252, Line 2, delete "Nuumber" and insert -- Number --, therefor.

On sheet 2 of 7, in FIG. 2, under Reference Numeral 252, Line 2, delete "Nuumber" and insert -- Number --, therefor.

On sheet 2 of 7, in FIG. 2, under Reference Numeral 252, Line 2, delete "Nuumber" and insert -- Number --, therefor.

In the Specification

In Column 21, Line 38, Delete "(FIG." and insert -- (FIGS. --, therefor.

In Column 26, Line 7, Delete "(FIG." and insert -- (FIGS. --, therefor.

In Column 26, Line 16, Delete "(FIG." and insert -- (FIGS. --, therefor.

In the Claims

In Column 31, Line 58, In Claim 12, after "by" delete "the".

Signed and Sealed this
Eighteenth Day of June, 2024

Katherine Kelly Vidal
*Director of the United States Patent and Trademark Office*